(12) United States Patent
Ng et al.

(10) Patent No.: US 9,084,089 B2
(45) Date of Patent: Jul. 14, 2015

(54) MEDIA DATA EXCHANGE TRANSFER OR DELIVERY FOR PORTABLE ELECTRONIC DEVICES

(71) Applicant: Apple Inc., Cupertino, CA (US)

(72) Inventors: Stanley C. Ng, Los Altos, CA (US); Andrew Bert Hodge, Palo Alto, CA (US); Anthony M. Fadell, Portola Valley, CA (US); Jeffrey L. Robbin, Los Altos, CA (US); Robert Edward Borchers, Pleasanton, CA (US); Chris Bell, Pacifica, CA (US); Eddy Cue, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/246,784

(22) Filed: Apr. 7, 2014

(65) Prior Publication Data

US 2014/0221018 A1 Aug. 7, 2014

Related U.S. Application Data

(63) Continuation of application No. 12/909,772, filed on Oct. 21, 2010, now Pat. No. 8,694,024, which is a continuation of application No. 11/515,270, filed on Sep. 1, 2006, now Pat. No. 7,831,199.

(60) Provisional application No. 60/756,122, filed on Jan. 3, 2006, provisional application No. 60/805,328, filed on Jun. 20, 2006.

(51) Int. Cl.
*H04W 4/00* (2009.01)
*H04W 4/04* (2009.01)
*H04L 29/08* (2006.01)

(52) U.S. Cl.
CPC .............. *H04W 4/04* (2013.01); *H04L 67/04* (2013.01); *H04L 67/06* (2013.01); *H04L 67/1095* (2013.01); *H04L 67/22* (2013.01)

(58) Field of Classification Search
CPC ........ H04N 7/173; H04N 9/806; H04H 20/57
USPC .......................... 455/3.01, 3.05, 404.2, 432.3
See application file for complete search history.

(56) References Cited

U.S. PATENT DOCUMENTS

| 4,090,216 A | 5/1978 | Constable |
| 4,386,345 A | 5/1983 | Narveson et al. |

(Continued)

FOREIGN PATENT DOCUMENTS

| DE | 4334773 | 4/1994 |
| DE | 4445023 | 6/1996 |

(Continued)

OTHER PUBLICATIONS

International Search Report and Written Opinion for PCT/US2006/048741, dated Jan. 23, 2008. pp. 1-13.

(Continued)

*Primary Examiner* — Tu X Nguyen
(74) *Attorney, Agent, or Firm* — Meyertons, Hood, Kivlin, Kowert & Goetzel, P.C.

(57) ABSTRACT

Methods and systems that facilitate data delivery to electronic devices are disclosed. One aspect pertains to data delivery to electronic devices that are portable, such as, mobile devices. In one embodiment, one mobile device discovers another mobile device within its vicinity. The mobile devices can then wirelessly transmit data from one mobile device to the other. The mobile devices, or their users, can control, request or influence the particular data content being delivered.

15 Claims, 20 Drawing Sheets

(56) References Cited

U.S. PATENT DOCUMENTS

| | | |
|---|---|---|
| 4,451,849 A | 5/1984 | Fuhrer |
| 4,589,022 A | 5/1986 | Prince et al. |
| 4,908,523 A | 3/1990 | Snowden et al. |
| 4,928,307 A | 5/1990 | Lynn |
| 4,951,171 A | 8/1990 | Tran et al. |
| 5,185,906 A | 2/1993 | Brooks |
| 5,293,494 A | 3/1994 | Saito et al. |
| 5,379,057 A | 1/1995 | Clough |
| 5,406,305 A | 4/1995 | Shimomura et al. |
| 5,559,945 A | 9/1996 | Beaudet et al. |
| 5,566,337 A | 10/1996 | Szymanski et al. |
| 5,583,993 A | 12/1996 | Foster et al. |
| 5,608,698 A | 3/1997 | Yamanoi et al. |
| 5,616,876 A | 4/1997 | Cluts |
| 5,617,386 A | 4/1997 | Choi |
| 5,670,985 A | 9/1997 | Cappels, Sr. et al. |
| 5,675,362 A | 10/1997 | Clough et al. |
| 5,684,513 A | 11/1997 | Decker |
| 5,710,922 A | 1/1998 | Alley et al. |
| 5,712,949 A | 1/1998 | Kato et al. |
| 5,717,422 A | 2/1998 | Fergason |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,760,588 A | 6/1998 | Bailey |
| 5,778,374 A | 7/1998 | Dang et al. |
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,041,023 A | 3/2000 | Lakhansingh |
| 6,052,654 A | 4/2000 | Gaudet et al. |
| 6,108,426 A | 8/2000 | Stortz |
| 6,122,340 A | 9/2000 | Darley et al. |
| 6,158,019 A | 12/2000 | Squibb |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,297,795 B1 | 10/2001 | Kato et al. |
| 6,298,314 B1 | 10/2001 | Blackadar et al. |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,452,610 B1 | 9/2002 | Reinhardt et al. |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,127 B1 | 7/2003 | Leeke et al. |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,607 B1 | 8/2003 | Davis et al. |
| 6,611,789 B1 | 8/2003 | Darley |
| 6,617,963 B1 | 9/2003 | Watters et al. |
| 6,621,768 B1 | 9/2003 | Keller et al. |
| 6,623,427 B2 | 9/2003 | Mandigo |
| 6,631,101 B1 | 10/2003 | Chan et al. |
| 6,693,612 B1 | 2/2004 | Matsumoto et al. |
| 6,731,312 B2 | 5/2004 | Robbin |
| 6,760,536 B1 | 7/2004 | Amir et al. |
| 6,762,741 B2 | 7/2004 | Weindorf |
| 6,775,539 B2 | 8/2004 | Deshpande |
| 6,781,611 B1 | 8/2004 | Richard |
| 6,794,566 B2 | 9/2004 | Pachet |
| 6,799,226 B1 | 9/2004 | Robbin et al. |
| 6,801,964 B1 | 10/2004 | Mahdavi |
| 6,832,373 B2 | 12/2004 | O'Neill |
| 6,844,511 B1 | 1/2005 | Hsu et al. |
| 6,870,529 B1 | 3/2005 | Davis |
| 6,876,947 B1 | 4/2005 | Darley et al. |
| 6,882,955 B1 | 4/2005 | Ohlenbusch et al. |
| 6,886,749 B2 | 5/2005 | Chiba et al. |
| 6,898,550 B1 | 5/2005 | Blackadar et al. |
| 6,911,971 B2 | 6/2005 | Suzuki et al. |
| 6,918,677 B2 | 7/2005 | Shipman |
| 6,931,377 B1 | 8/2005 | Seya |
| 6,934,812 B1 | 8/2005 | Robbin et al. |
| 6,950,087 B1 | 9/2005 | Knox et al. |
| 7,010,365 B2 | 3/2006 | Maymudes |
| 7,028,096 B1 | 4/2006 | Lee |
| 7,046,230 B2 | 5/2006 | Zadesky |
| 7,062,225 B2 | 6/2006 | White |
| 7,076,561 B1 | 7/2006 | Rosenberg et al. |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,131,059 B2 | 10/2006 | Obrador |
| 7,143,241 B2 | 11/2006 | Hull |
| 7,146,437 B2 | 12/2006 | Robbin et al. |
| 7,171,331 B2 | 1/2007 | Vock et al. |
| 7,191,244 B2 | 3/2007 | Jennings et al. |
| 7,213,228 B2 | 5/2007 | Putterman et al. |
| 7,234,026 B2 | 6/2007 | Robbin et al. |
| 7,272,385 B2 | 9/2007 | Mirouze et al. |
| 7,277,928 B2 | 10/2007 | Lennon |
| 7,301,857 B2 | 11/2007 | Shah et al. |
| 7,343,317 B2 | 3/2008 | Jokinen et al. |
| 7,356,679 B1 | 4/2008 | Le et al. |
| 7,502,626 B1 | 3/2009 | Lemilainen |
| 7,508,535 B2 | 3/2009 | Hart et al. |
| 7,627,343 B2 | 12/2009 | Fadell et al. |
| 8,188,357 B2 | 5/2012 | Robbin et al. |
| 2001/0013983 A1 | 8/2001 | Izawa et al. |
| 2001/0018668 A1 | 8/2001 | Yanase et al. |
| 2001/0029178 A1 | 10/2001 | Criss et al. |
| 2001/0036224 A1* | 11/2001 | Demello et al. .............. 375/220 |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0013818 A1 | 1/2002 | Yamaga |
| 2002/0028683 A1 | 3/2002 | Banatre et al. |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0059440 A1 | 5/2002 | Hudson et al. |
| 2002/0059499 A1 | 5/2002 | Hudson |
| 2002/0090912 A1 | 7/2002 | Cannon et al. |
| 2002/0116082 A1 | 8/2002 | Gudorf |
| 2002/0116517 A1 | 8/2002 | Hudson et al. |
| 2002/0122031 A1 | 9/2002 | Maglio et al. |
| 2002/0123359 A1 | 9/2002 | Wei et al. |
| 2002/0152045 A1 | 10/2002 | Dowling et al. |
| 2002/0156833 A1 | 10/2002 | Maurya et al. |
| 2002/0161865 A1 | 10/2002 | Nguyen |

(56) References Cited

U.S. PATENT DOCUMENTS

| | | |
|---|---|---|
| 2002/0173273 A1 | 11/2002 | Spurgat et al. |
| 2002/0189426 A1 | 12/2002 | Hirade et al. |
| 2002/0189429 A1 | 12/2002 | Qian et al. |
| 2002/0199043 A1 | 12/2002 | Yin |
| 2003/0002688 A1 | 1/2003 | Kanevsky et al. |
| 2003/0007001 A1 | 1/2003 | Zimmerman |
| 2003/0007464 A1 | 1/2003 | Balani |
| 2003/0018799 A1 | 1/2003 | Eyal |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zade sky |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0104835 A1 | 6/2003 | Douhet |
| 2003/0127307 A1 | 7/2003 | Liu et al. |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0182100 A1 | 9/2003 | Plastina et al. |
| 2003/0221541 A1 | 12/2003 | Platt |
| 2003/0229490 A1 | 12/2003 | Etter |
| 2003/0236695 A1 | 12/2003 | Litwin, Jr. |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0066363 A1 | 4/2004 | Yamano et al. |
| 2004/0069122 A1 | 4/2004 | Wilson |
| 2004/0076086 A1 | 4/2004 | Keller et al. |
| 2004/0086120 A1 | 5/2004 | Akins, III et al. |
| 2004/0094018 A1 | 5/2004 | Ueshima et al. |
| 2004/0103411 A1 | 5/2004 | Thayer |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0198436 A1 | 10/2004 | Alden |
| 2004/0199631 A1* | 10/2004 | Natsume et al. .............. 709/225 |
| 2004/0210628 A1 | 10/2004 | Inkinen et al. |
| 2004/0216108 A1 | 10/2004 | Robbin |
| 2004/0224638 A1 | 11/2004 | Fadell et al. |
| 2004/0242224 A1 | 12/2004 | Janik et al. |
| 2004/0246275 A1 | 12/2004 | Yoshihara et al. |
| 2004/0255135 A1 | 12/2004 | Kitaya et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1 | 3/2005 | Popofsky |
| 2005/0060542 A1 | 3/2005 | Risan et al. |
| 2005/0107031 A1 | 5/2005 | Wood et al. |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0146534 A1 | 7/2005 | Fong et al. |
| 2005/0149213 A1 | 7/2005 | Guzak et al. |
| 2005/0152294 A1 | 7/2005 | Yu et al. |
| 2005/0156047 A1 | 7/2005 | Chiba et al. |
| 2005/0160270 A1 | 7/2005 | Goldberg et al. |
| 2005/0166153 A1 | 7/2005 | Eytchison et al. |
| 2005/0216855 A1 | 9/2005 | Kopra et al. |
| 2005/0218303 A1 | 10/2005 | Poplin |
| 2005/0234983 A1 | 10/2005 | Plastina et al. |
| 2005/0245839 A1 | 11/2005 | Stivoric et al. |
| 2005/0246324 A1 | 11/2005 | Paalasmaa et al. |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2005/0270276 A1 | 12/2005 | Sugimoto et al. |
| 2006/0013414 A1 | 1/2006 | Shih |
| 2006/0025068 A1 | 2/2006 | Regan et al. |
| 2006/0026424 A1 | 2/2006 | Eto |
| 2006/0061563 A1 | 3/2006 | Fleck |
| 2006/0068760 A1 | 3/2006 | Hameed et al. |
| 2006/0071899 A1 | 4/2006 | Chang et al. |
| 2006/0088228 A1 | 4/2006 | Marriott et al. |
| 2006/0092122 A1 | 5/2006 | Yoshihara et al. |
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0135883 A1 | 6/2006 | Jonsson et al. |
| 2006/0143236 A1 | 6/2006 | Wu |
| 2006/0145053 A1 | 7/2006 | Stevenson et al. |
| 2006/0152382 A1 | 7/2006 | Hiltunen |
| 2006/0155914 A1 | 7/2006 | Jobs et al. |
| 2006/0170535 A1 | 8/2006 | Watters et al. |
| 2006/0173974 A1 | 8/2006 | Tang |
| 2006/0180668 A1* | 8/2006 | Casey ...................... 235/462.01 |
| 2006/0190577 A1 | 8/2006 | Yamada |
| 2006/0190980 A1 | 8/2006 | Kikkoji et al. |
| 2006/0221057 A1 | 10/2006 | Fux et al. |
| 2006/0221788 A1 | 10/2006 | Lindahl et al. |
| 2006/0259758 A1 | 11/2006 | Deng et al. |
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1 | 1/2007 | Hellman |
| 2007/0028009 A1 | 2/2007 | Robbin et al. |
| 2007/0061759 A1 | 3/2007 | Klein, Jr. |
| 2007/0089057 A1 | 4/2007 | Kindig |
| 2007/0106660 A1 | 5/2007 | Stern et al. |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |
| 2008/0168525 A1 | 7/2008 | Heller et al. |
| 2008/0288046 A1 | 11/2008 | Hemerick et al. |
| 2008/0305832 A1 | 12/2008 | Greenberg |
| 2010/0077338 A1 | 3/2010 | Matthews et al. |

FOREIGN PATENT DOCUMENTS

| | | |
|---|---|---|
| EP | 0127139 | 5/1984 |
| EP | 0578604 | 1/1994 |
| EP | 0757437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1028425 | 8/2000 |
| EP | 1028426 | 8/2000 |
| EP | 1076302 | 2/2001 |
| EP | 1213643 | 6/2002 |
| EP | 1289197 | 3/2003 |
| EP | 1503363 | 2/2005 |
| EP | 1530115 | 5/2005 |
| EP | 1536612 | 6/2005 |
| EP | 1566743 | 8/2005 |
| EP | 1566948 | 8/2005 |
| EP | 1372133 | 12/2005 |
| EP | 1622293 | 2/2006 |
| EP | 1686496 | 8/2006 |
| GB | 2 370 208 | 6/2002 |
| GB | 2384399 | 7/2003 |
| GB | 2399639 | 9/2004 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |

(56) References Cited

FOREIGN PATENT DOCUMENTS

| | | |
|---|---|---|
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| KR | 20010076508 | 8/2001 |
| WO | 01/33569 | 6/1995 |
| WO | 95/16950 | 6/1995 |
| WO | 98/17032 | 4/1998 |
| WO | 99/28813 | 6/1999 |
| WO | 00/22820 | 4/2000 |
| WO | 01/65413 | 9/2001 |
| WO | 01/67753 | 9/2001 |
| WO | 02/25610 | 3/2002 |
| WO | 03/023786 | 3/2003 |
| WO | 03/036457 | 5/2003 |
| WO | 03/036541 | 5/2003 |
| WO | 03/067202 | 8/2003 |
| WO | 2004/049182 | 6/2004 |
| WO | 2004/055637 | 7/2004 |
| WO | 2004/061850 | 7/2004 |
| WO | 2004/084413 | 9/2004 |
| WO | 2004077706 | 9/2004 |
| WO | 2004/104815 | 12/2004 |
| WO | 2005/031737 | 4/2005 |
| WO | 2005/048644 | 5/2005 |
| WO | 2005/008505 | 7/2005 |
| WO | 2005/109781 | 11/2005 |
| WO | 2006/040737 | 4/2006 |
| WO | 2006071364 | 7/2006 |
| WO | 2006108104 | 10/2006 |

OTHER PUBLICATIONS

Office Action for Australian Patent Application No. 2006335157, dated Aug. 12, 2009. pp. 1-3.
Office Action for UK Patent Application No. 0813592.3, dated May 21, 2010. pp. 1-2.
Office Action for EP Patent Application No. 06 847 893.2, dated May 7, 2010. pp. 1-5.
U.S. Appl. No. 10/963,233, entitled "Method and system for dynamically populating groups in a developer environment" filed Sep. 7, 2004.
Great Blitain Search and Examination Report dated Sep. 30, 2010 from Great Blitain Application No. 0813588.1.
European Office Action dated Nov. 25, 2010 from European Application No. 06847890.8.
U.S. Appl. No. 12/909,772, filed Oct. 21, 2010, Stanley C. NG.
"Apple Announces iTunes 2," Press Release, Apple Computer, Inc., Oct. 23, 2001.
"Apple Introduces iTunes—World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Combination Belt Clip Leaf Spring and Housing Latch", Wandt et al.; Motorola Technical Developments, Motorla Inc. Schaumburg, IL. vol. 18, Mar. 1, 1993.
"Creative Zen Vision: M 30GB", Dec. 21, 2005; downloaded on Jan. 11, 2008 from http ://web.archive.org/web/20051221050140/http:// www.everthingusb.com/creative_zen_vision:m_30gb.html>.
"Nomad Jukebox," User Guide, Creative Technology Ltd., Version 1, Aug. 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"12.1" 925 Candela Mobile PC", downloaded from LCDHardware. com on Dec. 19, 2002, http://www.lcdharware.com/panel/12_1_panel/default.asp.
"BL82 Series Backlit Keyboards", www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 fromhttp:// www.bluetoothpcheadsets.com/connect.htm.
"Creative liefert erstes Portable Media Center aus" [Online] Sep. 2, 2004, Retrieved from the internet on Sep. 20, 2007 from http://www. golem.de/0409/33347.html>.
"Creative MuVo TX 256 MB," T3 Magazine, Aug. 17, 2004, http:// www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi-Media Reporting and Convergence, 2 pgs.
"Eluminx Illuminated Keyboard", downloaded Dec. 19, 2002, http:// www.elumix.com/.
"How to Pair a Bluetooth Headset & Cell Phone", About.com; downloaded on Apr. 29, 2006 from http://mobileoffice.about.com/od/ usingyourphone/ht/blueheadset_p.htm.
"Peripherals for Industrial Keyboards & Pointing Devices", Stealth Computer Corporation, downloaded on Dec. 19, 2002, http://www. stealthcomputer.com/peropherals_oem.htm.
"Poly/Optical Fiber Optic Membrane Switch Backlighting", downloaded Dec. 19, 2002, http://www.poly/optical.com/membrane_switches.html.
"Public Safety Technologies Tracer 2000 Computer", downloaded Dec. 19, 2002, http://www.pst9II.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http:// www.sonyericsson.com/spg.jsp?cc=global&lc=en&ver=4001 &template=pc 3-1-1&z . . . .
"TAOS, Inc., Announces Industry's First Ambient Light Sensor to Convert Light Intensity to Digital Signals", www.taosinc.com/ pressrelease_090902.htm, downloaded Jan. 23, 2003.
"Toughbook 28: Powerful, Rugged and Wireless", Panasonic: Toughbook Models, downloaded Dec. 19, 2002, http:www. panasonic.com/computer/notebook/html/Ola_s8.htm.
"When it Comes to Selecting a Projection TV, Toshiba Makes Everything Perfectly Clear, Previews of New Releases", www.bestbuy. com/HomeAudio Video/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/ easeofuse.html.
512MB Waterproof MP3 Player with FM Radio & Built/in Pedometer, Oregon Scientific, downloaded on Jul. 31, 2006 from http:// www2.oregonscientific.com/shop/product.asp?cid=4&scid=II &pid=581.
Adam C. Engst, "SoundJam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1/2.
Andrew Birrell, "Personal Jukebox (PJB)," Oct. 13, 2000, http:// birrell.org/andrew/talks/pjb-overview.ppt.
Apple iPod Technical Specifications, iPod 20GB and 60GB Mac + PC, downloaded from http://www.apple.com/ipod/color/specs.html on Aug. 8, 2005.
Apple iTunes Smart Playlists, downloaded Apr. 5, 2005 from http:// web.archive.org/web/20031002011316/www.apple.com/itunes/ smartpla y lis ts . . . pp. 1-2.

(56) References Cited

OTHER PUBLICATIONS

AU Examination Report dated May 11, 2010 from AU Patent Application No. 2006335156.
Australian Office Action dated Dec. 1, 2009 from Australian Patent Application No. 2006335156.
Bociurkiw, Michael, "Product Guide: Vanessa Matz,", www.forbes.com/asap/2000/1 127/vmaiiz_print.html, Nov. 27, 2000.
Compaq, "Personal Jukebox," Jan. 24, 2001, http://research.compaq.com/SRC/pjb/.
Creative: "Creative NOMAD Mu Vo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http ://web.archive.org/web/20041024075901/www.creative.com/products/productasp?category=213&subcategory=215&product=l10 [downloaded Jun. 7, 2006].
CREATIVE: "MP3 Player," www.creative.com, Nov. 1, 2004, http://web.archive.org/web/2004102407 4823/www.creative.com/products/productasp?category=213&subcategory=216&product=4983 [downloaded Jun. 7, 2006].
De Herrera, Chris, "Microsoft ActiveSync 3.1," Version 1.02, Oct. 13, 2000.
European Office Action dated Apr. 23, 2010 from European Patent Application No. 06 847 890.8.
Examination Report dated Sep. 1, 2009 in Singapore Application No. 200701865-8.
Office Action dated Feb. 20, 2008 in Japanese Application No. 2007-538196.
Office Action dated Feb. 25, 2008 in U.S. Appl. No. 11/749,599.
Office Action dated Feb. 3, 2010 in U.S. Appl. No. 11/439,613.
Office Action Dated Feb. 4, 2008 in U.S. Appl. No. 11/566,072.
Office Action dated Jan. 26, 2009 in U.S. Appl. No. 11/373,468.
Office Action dated Jun. 17, 2008 in U.S. Appl. No. 11/212,313.
Office Action dated Jun. 2, 2009 in U.S. Appl. No. 11/530,773.
Office Action dated Jun. 24, 2009 in U.S. Appl. No. 11/373,468.
Office Action dated Jun. 24, 2009 in U.S. Appl. No. 11/519,352.
Office Action dated Mar. 10, 2010 in U.S. Appl. No. 11/583,327.
Office Action dated Mar. 11, 2010 in U.S. Appl. No. 11/830,746.
Office Action dated Mar. 24, 2010 in U.S. Appl. No. 11/583,199.
Office Action dated Mar. 25, 2010 in U.S. Appl. No. 11/297,032.
Office Action dated Mar. 4, 2008 from U.S. Appl. No. 10/973,657.
Office Action dated Mar. 4, 2010 in U.S. Appl. No. 11/324,863.
Office Action dated Mar. 9, 2010 in U.S. Appl. No. 11/519,352.
Office Action dated May 11, 2009 in U.S. Appl. No. 11/680,580.
Office Action dated May 27, 2009 in U.S. Appl. No. 11/439,613.
Office Action dated May 29, 2009 in EP Application No. 06 847 856.9.
Office Action dated May 30, 2008 in Chinese Patent Application No. 02825938.6.
Office Action dated Nov. 16, 2009 in US Application No. 111144,541.
Office Action dated Nov. 16, 2009 in U.S. Appl. No. 11/439,613.
Office Action dated Oct. 16, 2008 in U.S. Appl. No. 11/327,544.
Office Action dated Oct. 16, 2009 in U.S. Appl. No. 11/583,199.
Office Action dated Oct. 23, 2009 in Chinese Application No. 2005 80048143. 9.
Office Action dated Sep. 1, 2008 in EP Application No. 06 256 215.2.
Office Action dated Sep. 10, 2009 in U.S. Appl. No. 11/746,548.
Office Action dated Sep. 2, 2009 in U.S. Appl. No. 11/515,270.
Office Action dated Sep. 25, 2009 in Chinese Application No. 200610130904.1.
Office Action dated Sep. 3, 2009 in U.S. Appl. No. 11/324,863.
Office Action in European Patent Application No. 05 855 368.6 dated Nov. 20, 2008.
Office Action in Japanese Patent Application No. 2008-045351 dated Aug. 5, 2008.
Office Action in U.S. Appl. No. 11/212,555 dated Aug. 14, 2008.
Partial International Search Report dated Feb. 1, 2008 in Patent Application No. PCT/US2007/010630.
Partial Search Report dated Sep. 6, 2007 in PCT Application No. PCT/US2007 /004810.
Personal Jukebox (PJB), "Systems Research Center and PAAD," Compaq Computer Corp., Oct. 13, 2000, http://research.compaq.com/SRC/pjb/.
Peter Lewis, "Two New Ways to Buy Your Bits," CNN Money, Dec. 31, 2003, pp. 1/4.
Sastry, Ravindra Wadali. "A Need for Speed: A New Speedometer for Runners", submitted to the Department of Electrical Engineering and Computer Science at the Massachusetts Institute of Technology, May 28, 1999.
Search Report dated Mar. 20, 2008 in Patent Application No. PCT/US2007/077789.
Search Report dated May 15, 2008 in PCT Application No. PCT/US2007 /019578.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.
SoundJam MP Plus, Representative Screens, published by Casady & Greene, Inc., Salinas, CA, 2000.
Specification Sheet, iTunes 2, Apple Computer, Inc., Oct. 31, 2001.
Spiller, Karen. "Low/decibel earbuds keep noise at a reasonable level", The Telegraph Online, dated Aug. 13, 2006, http://www.nashuatelegraph.com/ apps/pbcs .dll/ article ?Date=20060813&Cate ..Downloaded Aug. 16, 2006.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, http://db.tidbits.com/getbits.acgi ?tbart=06521.
Travis Butler, "Portable MP3: The Nomad Jukebox," Jan. 8, 2001, http://db.tidbits.com/getbits.acgi?tbaii=06261.
U.S. Appl. No. 11/621,541, "Personalized Podcasting Podmapping" filed Jan. 9, 2007.
UK Office Action dated May 13, 2010 from UK Patent Application No. GB813588.1.
Waterproof Music Player with FM Radio and Pedometer User Manual, Oregon Scientific, 2005.
Examiner's Report dated Feb. 9, 2010 from Australian Patent Application No. 2006335156.
Hart-Daves, Guy, "How to Do Everything with Your IPod & Mini IPod Mini", 2004, McGraw-Hill Professional, p. 33.
iAP Sports Lingo Ox09 Protocol V1.00, May 1, 2006.
IEEE 1394—Wikipedia, 1995, http://www.wikipedia.org/wiki/Firewire.
International Search Report dated Feb. 4, 2003 in corresponding application No. PCT/US2002/033330.
International Search Report dated Jun. 10, 2007 in corresponding application No. PCT/US2006/048738.
International Search Rep01i dated Apr. 5, 2006 from corresponding International Application No. PCT/US2005/038819.
International Search Report dated Dec. 5, 2007 in PCT Application No. PCT/US2007/004810.
International Search Report dated Feb. 18, 2008 in Patent Application No. PCT/US2007 /079766.
International Search Report dated Jul. 2, 2007 in related case PCT/US2006/048669.
International Search Report dated Jul. 7, 2008 in PCT Application No. PCT/US2007 /076793.
International Search Report dated Jun. 10, 2008 in PCT Application No. PCT/US2007 /010630.
International Search Report dated Jun. 19, 2007 in related Application PCT/US2006/048753.
International Search Rep01i dated May 21, 2007 from corresponding PCT Application No. PCT/US2006/048670.
International Search Report dated Nov. 24, 2006 in PCT Application No. PCT/US2005/046797.
International Search Report dated Oct. 10, 2008 in PCT Application No. PCT/US2007 /077160.
International Search Report Dated Sep. 27, 2007 in Application No. 05824296.7.

(56) References Cited

OTHER PUBLICATIONS

International Search Report in corresponding European Application No. 06256215.2 dated Feb. 20, 2007.
International Search Report in Patent Application No. PCT/US2006/048738 dated Jan. 29, 2008.
International Search Report in Patent Application No. PCT/US2007/077020 dated Jan. 28, 2008.
International Search Report m Patent Application No. PCT/US2007/076889 dated Jan. 28, 2008.
Invitation to Pay Additional Fees and Partial Search Report for corresponding PCT Application No. PCT/US2005/046797 dated Jul. 3, 2006.
Invitation to Pay Additional Fees and Partial Search Report for PCT Application No. PCT/US2007/077160 dated Apr. 1, 2008.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
iTunes, Wikipedia, the free encyclopedia; downloaded on Oct. 5, 2005, pp. 1-6.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Kadir et al., "Adaptive Fast Playback-Based Video Skimming Using a Compressed-Domain Visual Complexity Measure", 2004 IEEE International Conference on Multimedia and Expo, pp. 2055-2058.
Kennedy, "Digital Data Storage Using Video Disc," IBM Technical Disclosure Bulletin, vol. 24, No. 2, Jul. 1981.
Miniman, "Applian Software's Replay Radio and Player v1.02," Product review, pocketnow .com, http://www. pocketnow .com/reviews/replay/replay.htm, Jul. 31, 2001.
Musicmatch, "Musicmatch and Xing Technology Introduce Musicmatch Jukebox," May 18, 1998, http://www.musicmatch.com/info/compan y/press/releases/?year= I 998&release=2.
Nonhoff/ Arps, et al., "Straf3enmusik Portable MP3/Spieler mit USB/ Anschluss," CT Magazin Fuer Computer Technik, Verlag Heinz Heise GmbH, Hannover DE, No. 25, Dec. 4, 2000.
Notice of Allowance dated Apr. 21, 2009 in U.S. Appl. No. 11/327,544.
Notice of Allowance dated Dec. 18, 2008 in U.S. Appl. No. 11/212,555.
Notice of Allowance dated Feb. 4, 2010 in U.S. Appl. No. 11/535,646.
Notice of Allowance dated Jun. 15, 2009 in U.S. Appl. No. 11/212,313.
Notification of Reason for Rejection from PCT Application No. 2003-539048 dated Nov. 27, 2007.
Nutzel et al., "Sharing Systems for Future HiFi Systems", The Computer Society, Jun. 2004.
Office Action dated Apr. 12, 2010 in U.S. Appl. No. 12/397,051.
Office Action dated Apr. 13, 2010 in U.S. Appl. No. 12/406,793.
Office Action dated Apr. 15, 2010 in U.S. Appl. No. 11/373,468.
Office Action dated Apr. 4, 2008 in U.S. Appl. No. 11/212,555.
Office Action dated Apr. 9, 2009 in U.S. Appl. No. 11/583,199.
Office Action dated Dec. 11, 2009 in U.S. Appl. No. 11/519,352.
Office Action dated Dec. 14, 2009 in U.S. Appl. No. 11/535,646.
Office Action dated Dec. 15, 2008 in U.S. Appl. No. 11/212,313.
Office Action dated Dec. 16, 2009 in U.S. Appl. No. 11/746,548.
Office Action Dated Feb. 1, 2008 in U.S. Appl. No. 11/327,544.
Written Opinion dated Dec. 5, 2007 in PCT Application No. PCT/US2007 /004810.
Written Opinion dated Feb. 18, 2008 in Patent Application No. PCT /US2007 /0797 66.
Written Opinion dated Jan. 6, 2009 in Singapore Application No. 0701865-8.
Written Opinion dated Jul. 7, 2008 in PCT Application No. PCT/US2007 /076793.
Written Opinion dated Jun. 10, 2008 in PCT Application No. PCT/US2007 /010630.
Written Opinion dated Mar. 20, 2008 in Patent Application No. PCT/US2007 /077789.
Written Opinion dated May 15, 2008 in PCT Application No. PCT/US2007 /019578.
Written Opinion dated Oct. 10, 2008 in PCT Application No. PCT /US2007 /077160.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Written Opinion of the International Searching Authority dated Nov. 24, 2006 in PCT Application No. PCT/US2005/046797.
Yee et al., "Faceted Metadata for Image Search and Browsing." Association for Computing Machinery, Conference Proceedings, Apr. 5, 2003.

\* cited by examiner

MEDIA DATA EXCHANGE TRANSFER OR DELIVERY FOR PORTABLE ELECTRONIC DEVICES

CROSS-REFERENCE TO RELATED APPLICATIONS

This application is a continuation of U.S. patent application Ser. No. 12/909,772, filed Oct. 21, 2010, and entitled "MEDIA DATA EXCHANGE, TRANSFER OR DELIVERY FOR PORTABLE ELECTRONIC DEVICES," which is a continuation of U.S. patent application Ser. No. 11/515,270, filed Sep. 1, 2006, now U.S. Pat. No. 7,831,199, and entitled "MEDIA DATA EXCHANGE, TRANSFER OR DELIVERY FOR PORTABLE ELECTRONIC DEVICES," which claims priority to U.S. Provisional Patent Application No. 60/756,122, filed Jan. 3, 2006, and entitled "MULTIMEDIA DATA SHARING," and U.S. Provisional Patent Application No. 60/805,328, filed Jun. 20, 2006, and entitled "WIRELESS COMMUNICATION SYSTEM." All of the foregoing are hereby incorporated herein by reference in their entirety.

This application is related to: (i) U.S. patent application Ser. No. 11/485,142, filed Jul. 11, 2006, and entitled "WIRELESS COMMUNICATION SYSTEM," now U.S. Pat. No. 7,724,716, which is hereby incorporated herein by reference; (ii) U.S. patent application Ser. No. 11/324,863, filed Jan. 3, 2006, and entitled "REMOTE CONTENT UPDATES FOR PORTABLE MEDIA DEVICES," now U.S. Patent Publication No. 2007/0169087, which is hereby incorporated herein by reference; (iii) U.S. patent application Ser. No. 11/210,172, filed Aug. 22, 2005, and entitled "AUDIO SAMPLING AND ACQUISITION SYSTEM," now U.S. Patent Publication No. 2006/0235864, which is hereby incorporated herein by reference; (iv) U.S. application Ser. No. 10/987,649, filed Nov. 12, 2004, and entitled "WIRELESS SYNCHRONIZATION BETWEEN MEDIA PLAYER AND HOST DEVICE," now U.S. Patent Publication No. 2006/0168351, which is hereby incorporated herein by reference; and (v) U.S. application Ser. No. 10/423,490, filed Apr. 25, 2003, and entitled "MEDIA PLAYER SYSTEM," now U.S. Pat. No. 7,627,343, which is hereby incorporated herein by reference.

BACKGROUND OF THE INVENTION

1. Field of the Invention

The present invention relates to portable electronic devices and, more particularly, to wireless data exchange with portable electronic devices.

2. Description of the Related Art

Portable electronic devices, such as mobile phones, MP3 players and Personal Digital Assistants (PDAs), are often used by individuals on a personal basis. In other words, it is not uncommon for a person to carry a portable electronic device with them throughout their day. Often, these portable electronic devices store media data for use by their user. In the case of MP3 player or PDAs, media data is typically downloaded from a host computer when the MP3 player or PDA is connected to the host computer by way of a cable (USB cable). In the event that a MP3 player or PDA supports wireless communication, it is possible that the downloading of media data to the MP3 player or PDA could be performed in a wireless manner. In the case of mobile phones, media data (such as songs or ring tones) are downloaded over the wireless communication network (i.e., cellular phone network).

However, as portable electronic devices become more versatile and more interactive, it is advantageous to exchange (send and/or receive) media or other types of data with other electronic devices in a wireless manner.

Thus, there is need to facilitate wireless data exchange by the portable media devices.

SUMMARY OF THE INVENTION

The invention pertains to improved methods and systems that facilitate data delivery to electronic devices. One aspect pertains to data delivery to electronic devices that are portable, such as, mobile devices. In one embodiment, one mobile device discovers another mobile device within its vicinity. The mobile devices can then wirelessly transmit data from one mobile device to the other. Typically, the mobile devices are associated with persons (users). The mobile devices, or their users, can control, request or influence the particular data content being delivered.

The invention can be implemented in numerous ways, including as a method, system, device, apparatus (including graphical user interface), or computer readable medium. Several embodiments of the invention are discussed below.

As a method for delivery of data to a portable electronic device from another electronic device, one embodiment of the invention includes at least the acts of: discovering the another electronic device via a wireless network; requesting data from the another electronic device over the wireless network; and receiving from the another electronic device a wireless transmission of at least a portion of the data requested via the wireless network.

As a method for delivery of data to a portable electronic device from another electronic device, another embodiment of the invention includes at least the acts of: discovering the another electronic device via a wireless network; receiving information associated with the another electronic device over the wireless network; determining data to be shared with the another electronic device based on the received information; and transmitting the data to be shared to the another electronic device.

As a method for sharing data from a portable electronic device from at least one other electronic device, one embodiment of the invention includes at least the acts of: connecting to a wireless network; and transmitting profile information from the portable electronic device to the at least one other electronic device over the wireless network.

As a computer readable medium including at least computer program code for delivery of data to a portable electronic device from another electronic device, one embodiment of the invention includes at least: computer program code for identifying that the another embodiment device is within the vicinity of the portable electronic device; computer program code for requesting data from the another electronic device over a wireless link; and computer program code for receiving from the another electronic device a wireless transmission of at least a portion of the data requested via the wireless link.

As a portable electronic device capable of interacting with another portable electronic device in a wireless manner, one embodiment of the invention includes at least: wireless communication circuitry for wireless communication over a wireless link, a user input device, and a processor. The processor is configured to discover the another electronic device via a wireless link, request data from the another electronic device over the wireless link, and receive from the another electronic device a wireless transmission of at least a portion of the data requested via the wireless link.

As a method for acquiring media items for storage on a portable electronic device, one embodiment of the invention includes at least the acts of: accessing a remote media depository via a data network; requesting a set of media items from the remote media depository; and receiving and storing the set of media items at the portable electronic device over the data network.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved methods and systems that facilitate data delivery to electronic devices. One aspect pertains to data delivery to electronic devices that are portable, such as, mobile devices. In one embodiment, one mobile device discovers another mobile device within its vicinity. The mobile devices can then wirelessly transmit data from one mobile device to the other. Typically, the mobile devices are associated with persons (users). The mobile devices, or their users, can control, request or influence the particular data content being delivered.

The data delivery described is particularly suited for delivery of media data. "Media data," as used herein, is digital data that pertains to at least one of audio, video, and images. Some examples of specific forms of media data (which can be referred to as "media items") include, but are not limited to, songs, albums, audiobooks, playlists, movies, music videos, photos, computer games, podcasts, audio and/or video presentations, news reports, and sports updates. Media data is also referred to as media content herein.

Embodiments of the invention are discussed below with reference to FIGS. 1-15C. However, those skilled in the art will readily appreciate that the detailed description given herein with respect to these figures is for explanatory purposes as the invention extends beyond these limited embodiments.

Various aspects, embodiments and implementations of data exchange are described below. These aspects, embodiments and implementations can be utilized separately or in any combination.

Data Exchange Environment

One aspect of the invention pertains to a data exchange environment. The data exchange environment facilitates exchange of data between electronic devices using wired and/or wireless means. The data exchange environment can pertain to exchange of media data, in which case the data exchange environment can be considered a media exchange environment.

Figure 1:
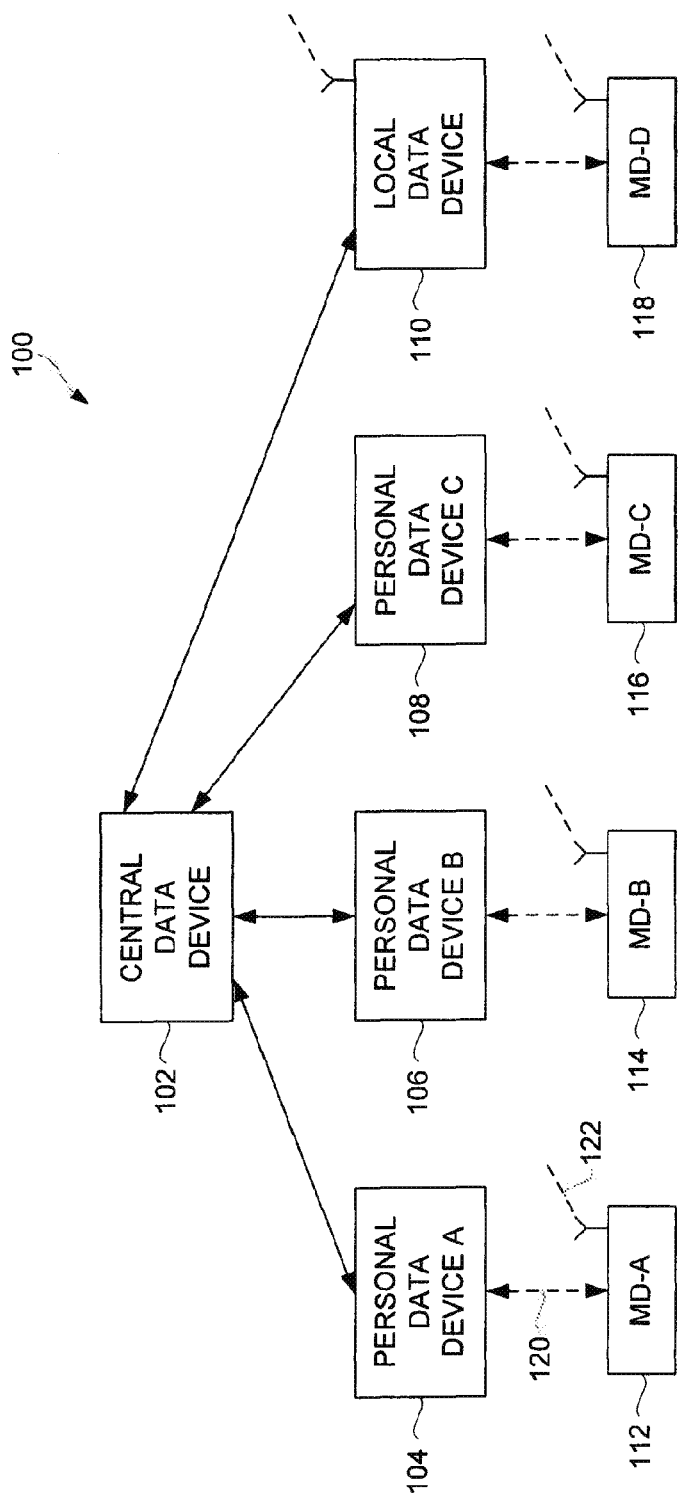
FIG. 1 is a block diagram of a data exchange system according to one embodiment of the invention.

FIG. 1 is a block diagram of a data exchange system 100 according to one embodiment of the invention. The data exchange system 100 permits data exchange between a plurality of different electronic devices. At a minimum, these electronic devices are capable of receiving and storing digital data, and may also be capable of transferring digital data. Still further, these electronic devices may also process, display, present (e.g., play) or otherwise utilize digital data.

The data exchange system 100 includes a central data device 102. The central data device 102 is a central data store that stores data (i.e., digital data) that can be acquired by any of the various electronic devices within the data exchange system 100. In particular, a personal data device A 104, a personal data device B 106 and a personal data device C 108 are each able to couple to the central data device 102. In one embodiment, these personal data devices 104-108 couple to the central data device 102 over a data network, such as a global data network (e.g., the Internet). Similarly, a local data device 110 can couple to the central data device 102. In one embodiment, the local data device 110 can store a complete or partial copy of the data stored in the central data device 102.

The data exchange system 100 can also support a plurality of mobile devices (MD) 112-118 that can interact with a corresponding one of the personal data devices 104-108 or the local data device 110. For example, the mobile device (MD-A) 112 can couple to the personal data device A 104 over a wired or wireless link 120. The mobile device (MD-A) 112 can also wirelessly couple to any of a number of other electronic devices to share data therewith. For example, the mobile device (MD-A) 112 can couple to one or more of the mobile devices (MD) 114-118 and/or the local data device 110 over a wireless link 122.

The data being shared by the data exchange system 100 can be media data, user data, news data, etc. The data can also be referred to as personal data, namely, data that is stored on a user's device. The central data device 102 can be a central server, the local data device 110 can be a local server, the personal data devices 104-108 can be personal computers, and the mobile devices 112-118 can be highly portable electronic devices. For example, the highly portable electronic devices can be handheld or smaller. In one implementation, the highly portable electronic devices can be palm-sized, such that they easily fit within the hand or palm of its user. In another implementation, the highly portable electronic devices can be wearable.

Figure 2:
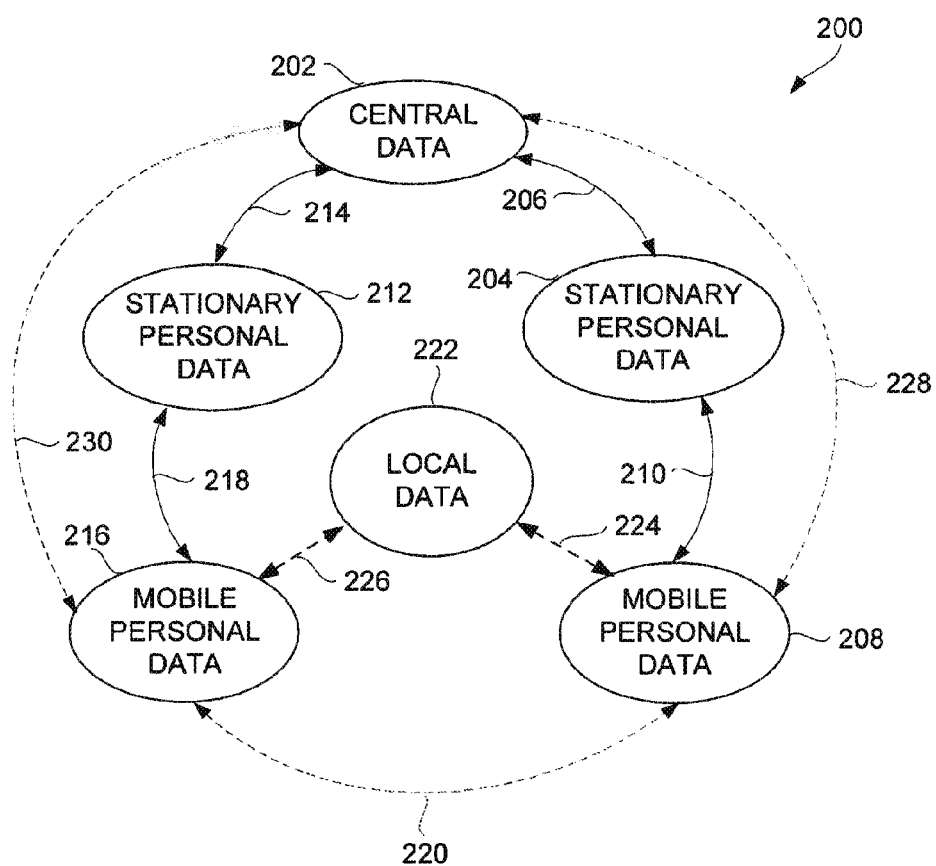
FIG. 2 is a schematic diagram of a data exchange environment according to one embodiment of the invention.

FIG. 2 is a schematic diagram of a data exchange environment 200 according to one embodiment of the invention. The data exchange environment 200 is, for example, suitable for implementation by the data exchange system 100 illustrated in FIG. 1. The data exchange environment 200 provides the ability for electronic devices to share data from one device to another. The sharing of data enables the data to be more readily available.

The data exchange environment 200 includes central data 202. The central data 202 represents centralized data that can be used by a variety of different electronic devices. As an example, the central data can be provided by the central data device 102 illustrated in FIG. 1. The data exchange environment 200 also includes stationary personal data 204. The stationary personal data 204 is personal data that is stored within an electronic device that is generally stationary. As an example, the stationary personal data 204 can be stored within the personal data device A 104 illustrated in FIG. 1. The stationary personal data 204 can be acquired from the central data 202 over a link 206. Some or all of the stationary personal data 204 can be provided as mobile personal data 208. The mobile personal data can be acquired from the stationary personal data 204 over a wired or wireless link 210 and stored within an electronic device that is generally mobile. As an example, the mobile personal data 208 can be stored within the mobile device A 112 illustrated in FIG. 1. Similarly, the data exchange environment 200 can include stationary personal data that is coupled to the central data 202 over a link 214 and mobile personal data 216 that is coupled to the stationary personal data 212 over a wired or wireless link 218. Hence, the central data 202, the stationary personal data 204 and the mobile personal data 208 can represent a hierarchy of digital data, where data can be shared throughout the hierarchy. Since the data being shared is often associated with a given user, the data can be conveniently available at multiple points in the hierarchy.

The data exchange environment 200 can also permit data sharing between the mobile personal data 208 and the mobile personal data 216 over a link 220. Typically, the link 220 is a wireless link. The wireless link can be implemented by radio frequency transmissions, optical transmissions, etc. Since the mobile personal data 208 and the mobile personal data 216 are typically associated with different users, the sharing of such data can provide access to data beyond that available from the hierarchy associated with the user.

The data exchange environment 200 can also include local data 222. The local data 222 represents data that is to be provided in a specific geographical location. The mobile personal data 208 can be linked to the local data 222 by a link 224, and the mobile personal data 216 can be linked to the local data 222 over a link 226. The links 224 and 226 are typically wireless links.

Additionally, the mobile personal data 208 can couple to the central data 202 directly over a link 228, and the mobile personal data 216 can couple to the central data 202 directly over a link 230. Typically, the links 228 and 230 are wireless links.

Hence, the mobile personal data 208 can be acquired from any one or more of the central data 202, the stationary personal data 204, the mobile personal data 216, or the local data 222. Likewise, the mobile personal data 216 can be acquired from any one or more of the central data 202, the stationary personal data 212, the mobile personal data 208, or the local data 222.

The data being shared can vary depending upon implementation. For example, the data being shared may pertain to video, music, games, photos, playlists, slideshows, etc. As another example, the data can be resource data, such as a map, which possible could be displayed by the data device. The data being shared can also be subscription content. The data can also pertain to a profile, such as a profile associated with a user. One class of data that can be shared is media data. The nature in which media items are shared can be unrestricted or restricted. Examples of restricted sharing of media items include a media item that has limited-use rights or which contains only a sample of the full content.

The data being shared can be transferred to a recipient device by file transfer or streaming. The data being transferred can be received by one or more data devices. Examples of data devices include a media player, PDA, a speaker unit, a wireless transmitter/receiver unit, etc. Users of data devices can also create and distribute content through data sharing. The streaming can be limited so as to restrict the number of data devices simultaneously receiving the data. On the other hand, if the users of the data devices are subscribers to the streaming content (i.e., have a subscription), then the streaming can be unlimited as to subscribers.

Data can be shared after being purchased. For example, a recipient could purchase data from a remote server. The remote server would then cause the purchased data to be delivered to the recipient's data device. The purchase can be performed in real-time or can be deferred until a later point in time. Thereafter, the purchased data can be shared from the recipient's data device to another data device.

The sharing or exchange of data can be automatic, manual or a combination of manual and automatic. For example, automatic sharing of data can occur when a data device comes within range of a wireless transmission of data. As another example, data can be automatically transferred in the context of a synchronize operation. The synchronize operation can be automatic or operated in accordance with a schedule. The synchronize operation can also be manually initiated.

The manner by which the data arrives at the data device can depend upon implementation. For example, the data can be directly transferred to the data device, or the data can be indirectly transferred to the data device. For example, the data transfer can be between one data device to another data device. Alternatively, one data device can cause another data device to transfer desired data to a recipient data device.

A data device can be used to control the data that is on the device or on an associated host device. For example, a user of a data device could either purchase, or mark for later purchase, media that they hear. In such case, the purchased data can be eventually received at the data device associated with the user (purchaser). Alternately, the user of the data device may request a shuffling of the data stored on the data device. The shuffling is, in effect, a remote shuffle of the data in that the data device can receive a new set of data (e.g., media items) following the shuffle operation.

Figure 3:
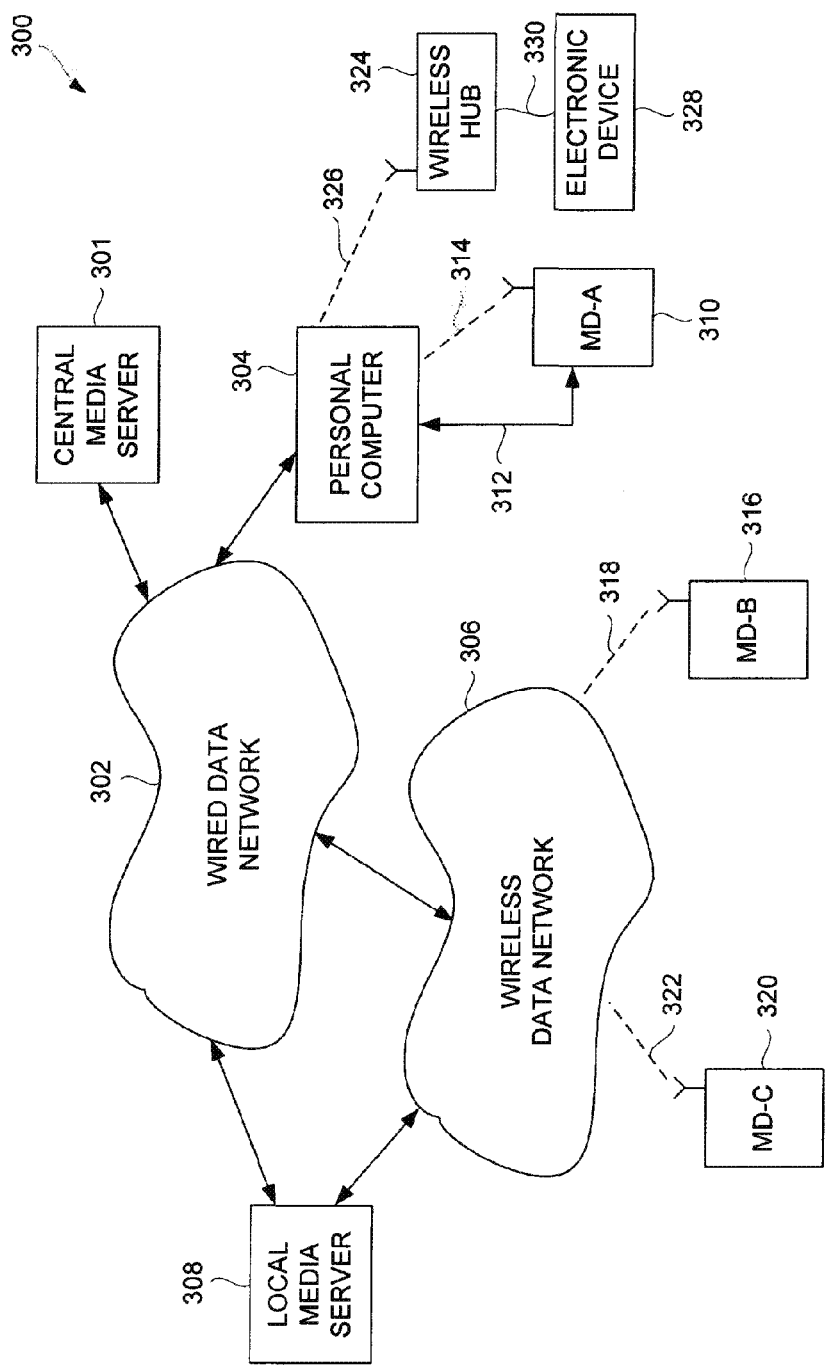
FIG. 3 is a block diagram of a media exchange system according to one embodiment of the invention.

FIG. 3 is a block diagram of a media exchange system 300 according to one embodiment of the invention. The media exchange system 300 permits the exchange of media data between various different electronic devices. Media data pertains to media such as music, video, photos, games, and the like. Although the media exchange system 300 is described in the context of sharing media data, it should be understood that, more generally, data can be shared using a data sharing system.

The media exchange system 300 includes a central media server 301 and a wired data network 302. The central media server 301 couples to the wired data network 302. The wired data network 302 can be a global network, a wide area network, or a local area network. In one example, the wired data network 302 pertains to some portion of the World Wide Web. A personal computer 304 can couple to the wired data network 302. A wireless data network 306 can also couple to the wired data network 302. The wireless data network 306 can include one or more wireless data networks, such as cellular networks, WiFi networks, WiMAX networks, Bluetooth networks, etc. The media exchange system 300 can also include a local media server 308 that can couple to one or both of the wired data network 302 and the wireless data network 306.

The central media server 301 stores or has access to numerous media items. The local media server 308 also stores or has access to various media items. In addition, the media exchange system 300 supports a plurality of portable media devices 310, 316 and 320. The portable media device 310 can communicate with the personal computer 304 over a wired link 312 or a wireless link 314. As an example, the wired link 312 can correspond to a cable that, if available, can interconnect the portable media device 310 to the personal computer 304. The wireless link 314 can be provided by a short range wireless capability, such as Bluetooth, infrared, etc. Typically, the portable media device 310 would be capable of communicating with the personal computer 304 using either the wired link 312 or the wireless link 314.

The portable media device 316 can couple to the wireless data network 306 over a wireless link 318. Similarly, the portable media device 320 can couple to the wireless data network 306 over a wireless link 322. In this regard, the portable media devices 316 and 320 can access the central media server 301 and/or the local media server 308 via the wireless data network 306. In addition, the portable media devices 310, 316, and 320 may be able to wirelessly access each other, thereby exchange media data between portable media devices.

Optionally, the media exchange system 300 illustrated in FIG. 3 can also support a wireless hub 324. The wireless hub 324 can couple to the personal computer 304 over a wireless hub 326. An electronic device 328 can then couple to the wireless hub over a link 330. In one embodiment, the link 330 is a cable. The electronic device 328 can be any of a wide variety of devices. For example, the electronic device 328 can be a stereo system, a printer, a television, a memory device, an appliance, a computer, etc. Alternatively, the wireless hub 324 could wirelessly couple to other devices within the media exchange system 300 besides the personal computer 304. For example, the wireless hub 324 could wirelessly link to the central media server 301, the local media server 308 or any of the media devices 310, 316 and 320.

In one embodiment, one or more of the mobile devices, such as the mobile devices 310, 316 or 320 illustrated in FIG. 3, can pertain to media devices. More particularly, the media devices can pertain to media players, such as the iPod® media player from Apple Inc. These mobile devices can include a media management application that operates on the mobile device. One example of a media management application is iTunes®, available from Apple Inc. Given the portability of mobile devices, mobile devices are smaller and have less resources. Consequently, a media management application designed for use on a mobile device may offer less features and capabilities than would a counterpart media management application operating on a larger, more powerful computing device, e.g., a personal computer. Given that the mobile devices have wireless access to the local media server 308 or the central media server 301, the mobile devices can interact with the media servers 301 and 308 to request and/or receive media data (or other data). In this regard, a media management application operating on the mobile devices can communicate with the media servers 301 and 308 to perform various tasks, including: navigating available media content at the servers (such as navigation of a media store), receiving a periodic delivery of media content to media devices (such as daily pushing media data from a server to a media device), etc.

Peer-to-Peer Data Sharing

According to another aspect of the invention, mobile devices (e.g., portable media devices) can communicate with one another. This type of communication can be referred to as peer-to-peer interaction. In this regard, one mobile device can communicate (e.g., unicast) directly with another mobile device. In another example, one mobile device can communicate (e.g., broadcast, anycast or multicast) to a plurality of other mobile devices. Still further, a mobile device can interact with other electronic devices besides a mobile device, such as portable media devices. For example, other electronic devices include speakers, computers, accessories, home entertainment products, etc.

A mobile device, such as a portable media player, can also operate as a remote controller for other electronic devices. For additional details on a portable media player operating as a remote controller, see, e.g., U.S. patent application Ser. No. 11/314,291, filed Dec. 20, 2005, entitled "PORTABLE MEDIA PLAYER AS A LOW POWER REMOTE CONTROL AND METHOD THEREOF", now U.S. Pat. No. 7,702,279, which is hereby incorporated herein by reference.

In the peer-to-peer environment, one mobile device can communicate with one or more other electronic devices (whether mobile or stationary) in the immediate vicinity. Data sharing can be performed when such communication is available.

In a public environment, such as a train, mobile devices can serve to enable riders on the train to share data in a peer-to-peer manner. In this regard, the mobile devices would discover other nearby (e.g., in the vicinity) mobile devices and then proceed to transfer data. The nature and extent of the data transfer can be controlled. For example, the data to be shared can be restricted (partially or fully) and/or require authorization. The type of data being exchanged can be media data or other data (e.g., contact information, user profile, etc.).

In the home environment, the peer-to-peer data transfer could be between a mobile device and a computing device, such as a home computer or another mobile device. Typically, the mobile device and the computing device would be associated with a particular user. For example, when the mobile device is within range of a home computer (or a home network), data transfer can be performed between the mobile device and the home computer. The data transfer can be automatic without any user action or can alternatively require manual approval by a user. In one embodiment, the data transfer can be part of a synchronization operation. For additional details on synchronization, particularly in a wireless manner, see, e.g., U.S. application Ser. No. 10/987,649, filed Nov. 12, 2004, and entitled "WIRELESS SYNCHRONIZATION BETWEEN MEDIA PLAYER AND HOST DEVICE", now U.S. Patent Publication No. 2006/0168351, which is hereby incorporated herein by reference.

In the work environment, as a user comes into an employer's office to work, the user's mobile device can transfer data to the user's work computer or to a network server for the office. The data transfer can be automatic without any user action or can alternatively require manual approval by a user. The user of the mobile device can also communicate with mobile devices of coworkers to exchange data. For example, in a meeting in a conference room, a mobile device having a slide presentation can be shared (e.g., streamed or transferred) to each of the mobile devices within the conference room.

Regardless of the particular environment, the data transfer can be wireless. The wireless data transfer can be facilitated by a wireless network. One mobile device could wirelessly transmit data in a unicast fashion from one mobile device to another mobile device or stationary computing device. Still further, one mobile device could wirelessly transmit data in a multicast or broadcast fashion to a plurality of other mobile devices.

The data being transferred can be associated with various types of data. For example, the data can pertain to personal information (such as a user profile), work documents, media data, etc. In one embodiment, the sharing of such data can be managed on mobile devices to control the type and extent of data transfer that is performed. Such control can be associated with the mobile device that is sending the data as well as a mobile device that is receiving the data.

In another embodiment, one mobile device can transmit their preferences within the general vicinity. The preferences that have been essentially published can then be used by other mobile or stationary devices within the proximity to determine whether they have any data for sharing with the mobile device, where such data for sharing is determined in accordance with the preferences that were transmitted. Also, in the context of personal information sharing, a user of a mobile device can provide a personal user profile that can be exchanged with other nearby mobile devices or stationary devices so that users of such other devices can understand the user of the mobile device and what his/her interests might be.

As noted previously, media devices are able to wirelessly share data with one another. For example, a user of a media device may configure or arrange for a subset of its media data to be shareable with other media devices. The scope or extent of sharing being permitted can be controlled by the media device, such as through use of a graphical user interface available on the media device. Alternatively, the scope or extent of sharing being permitted can be controlled by another media device. Additionally, in one embodiment, to facilitate sharing of media data, if a first user of a media device shares with a second user of another media device, the first person can receive an incentive reward for such sharing. In one example, the incentive award can be on-line media store credits. The nature or degree of the credits can be increased or restricted to those situations in which the second user buys the media content being shared from an authorized source, such as an on-line media store. In one embodiment, the media content being shared from the first media device to the second media device is a playlist.

Figure 4:
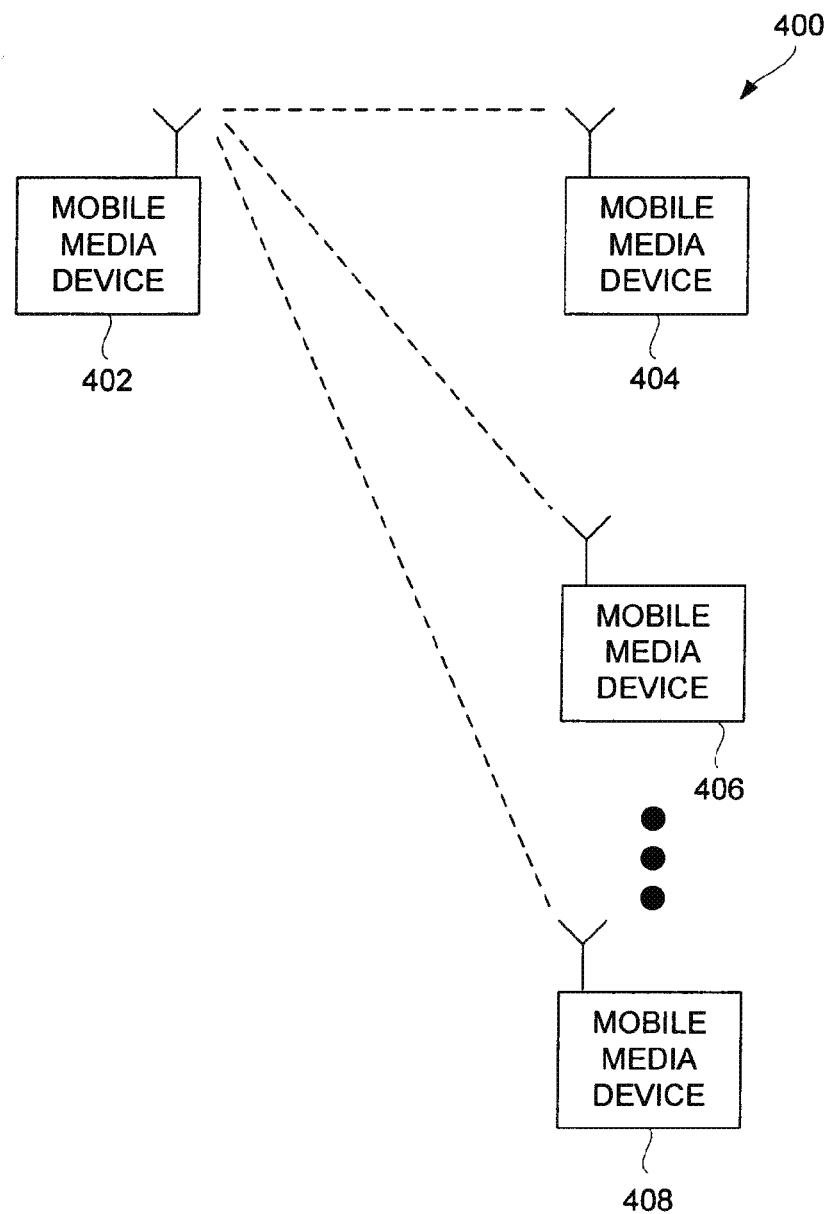
FIG. 4 is a block diagram of a peer-to-peer media sharing arrangement according to one embodiment of the invention.

FIG. 4 is a block diagram of a peer-to-peer media sharing arrangement 400 according to one embodiment of the invention. The media sharing arrangement 400 inclues a mobile media device 402 that wirelessly couples to one or more other mobile media devices 404-408. The mobile media device 402 can transmit media content to one of the mobile media devices 404-408, a plurality of the mobile media devices 404-408, or all of the mobile media devices 404-408. The transmission of the media content can, for example, be by broadcast, anycast, unicast, or multicast.

Figure 5A:
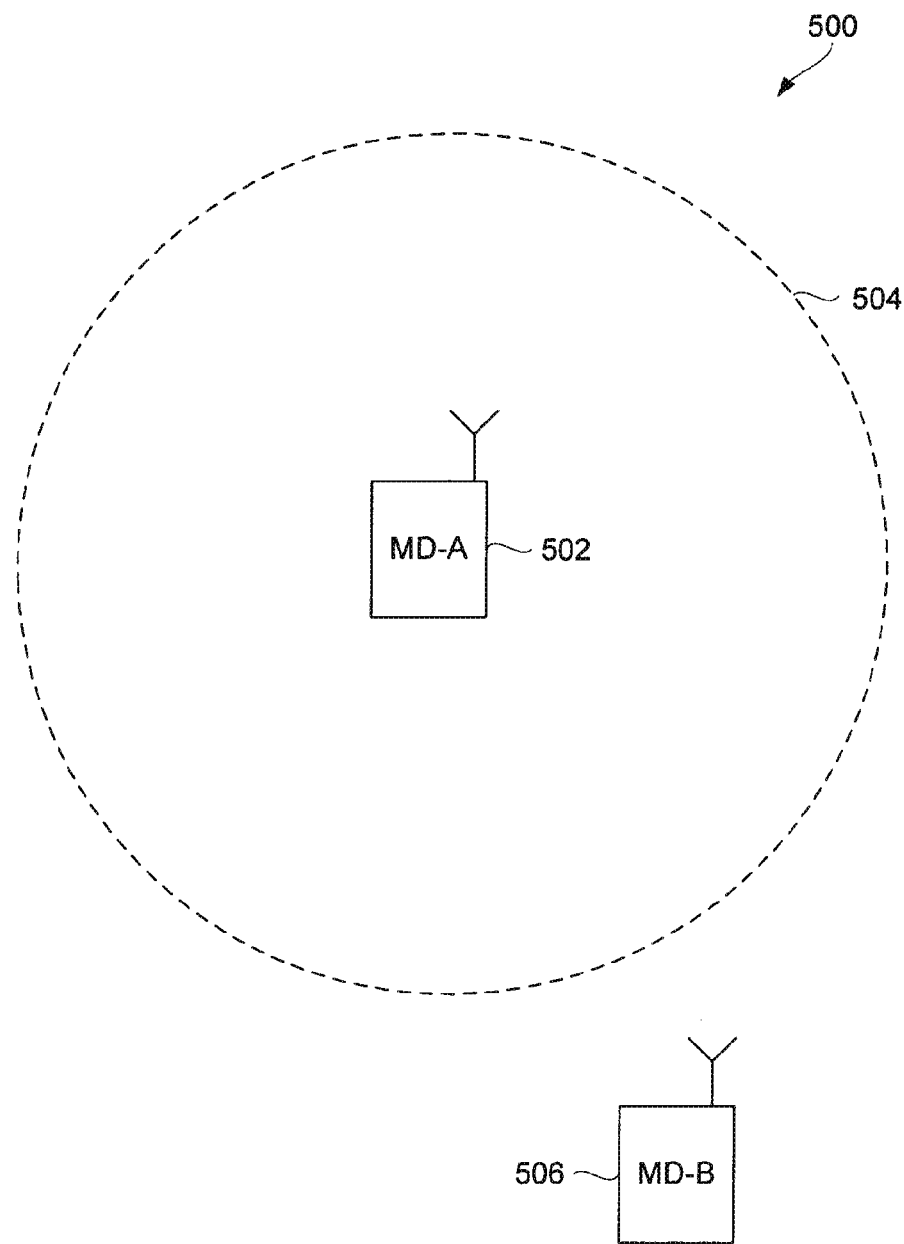
FIGS. 5A-5C illustrate wireless media sharing in a peer-to-peer environment according to one embodiment of the invention.
Figure 5B:
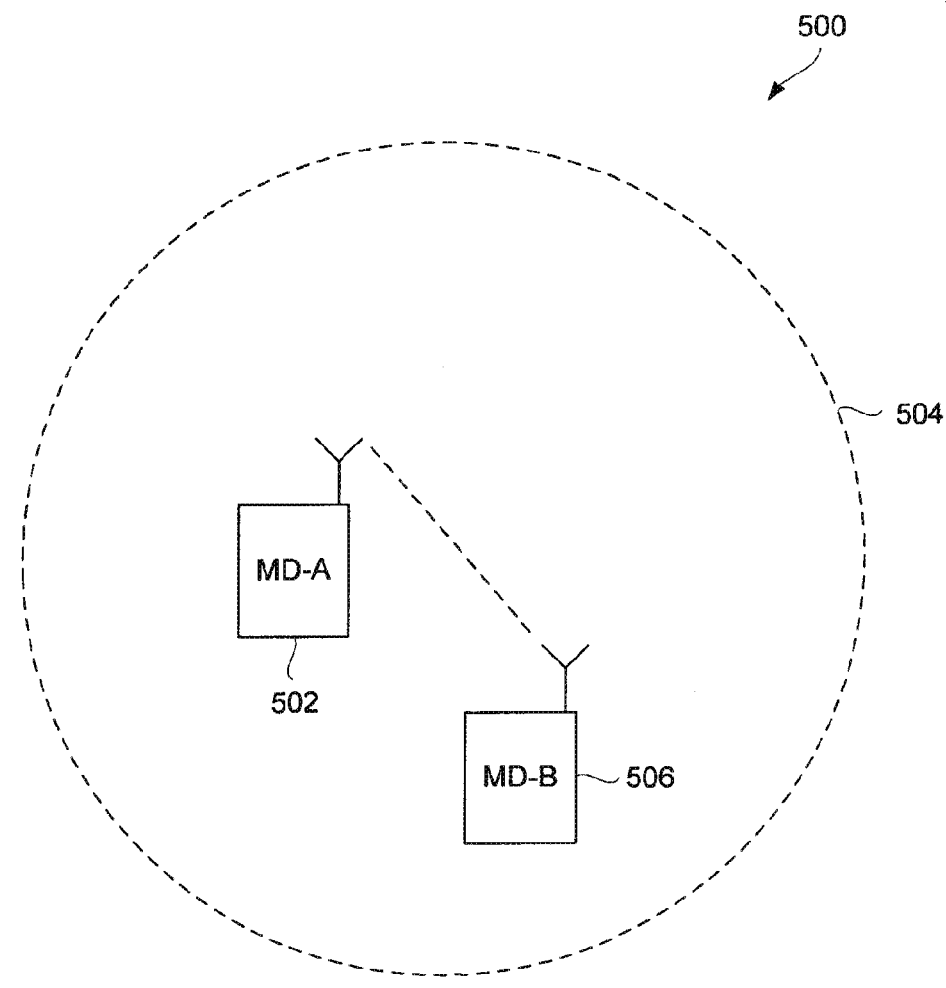
Figure 5C:
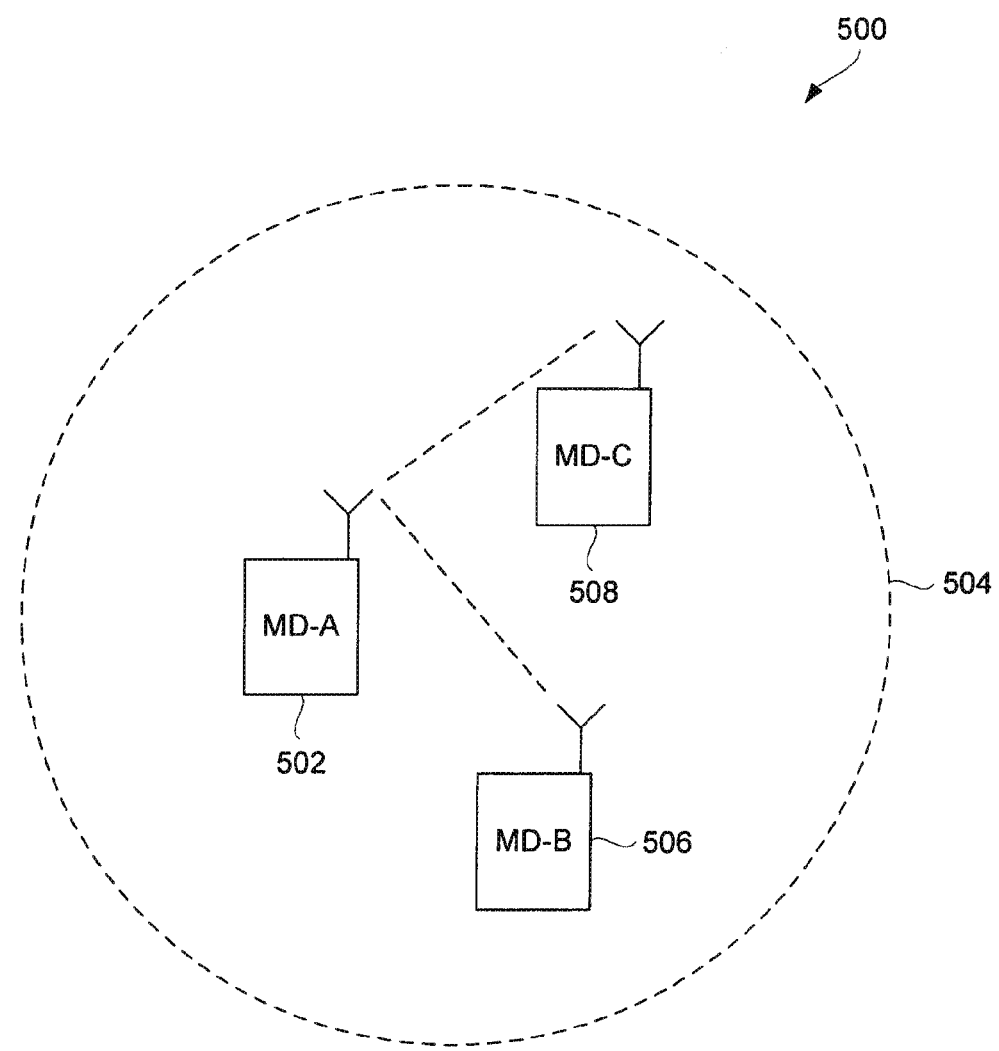

FIGS. 5A-5C illustrate wireless media sharing in a peer-to-peer environment according to one embodiment of the invention. In FIG. 5A, a wireless media sharing system 500 is depicted having a mobile media device 502 providing a wireless network 504. Although the wireless network 504 is omni-directional, it should be understood that the wireless network 504 could also be substantially directional. As shown in FIG. 5A, a mobile media device 506 is outside of the wireless local network 504 provided by the mobile media device 502. Accordingly, in the configuration shown in FIG. 5A, the mobile media device 502 and the mobile media device 506 are not able to communicate over the wireless network 504. In other words, the mobile media device 506 is out of range of the wireless network 504 provided by the mobile media device 502. Hence, even if the mobile media device 502 were transmitting data, the mobile media device 506 would be out of range and thus unable to receive the transmitted data.

In FIG. 5B, the mobile media device 506 has been repositioned, such as through movement of the user of the mobile media device 506. As a result, the mobile media device 506 is now within the wireless network 504. In other words, as shown in FIG. 5B, the mobile media device 506 is within range of the wireless network 504 provided by the mobile media device 502. Consequently, data can be transferred from the mobile media device 502 to the mobile media device 506. The mobile media device 506 would also typically be able to transfer data from the mobile media device 506 to the mobile media device 502.

In FIG. 5C, the wireless media sharing system 500 is generally similar to that illustrated in FIG. 5B, except that another mobile media device 508 is also provided within the wireless network 504. In this case, the mobile media device 502 can communicate with both the mobile media device 506 and the mobile media device 508. In one example, the mobile media device 502 can multicast or broadcast to both of the mobile media devices 506 and 508.

The media sharing that can be performed by the wireless media sharing system 500 illustrated in FIGS. 5A-5C can be used in a variety of different environments. For example, if the wireless network 504 is at home, the providing of a mobile media device in the home allows media transfer to occur with respect to the mobile media device. Similarly, when the wireless network 504 is at one's place of work, then the providing of the mobile media device at the place of work facilitates data transfer with the mobile media device. As another example, in public locations, mobile media devices may be within wireless range of one another, such that media transfers can occur, even if the users of the mobile media devices are unknown to one another.

Besides sharing media data between mobile media devices, other types of data can be shared. For example, personal information can be transferred between mobile media devices. The personal information to be shared can be transmitted (e.g., broadcast) by one mobile media device to other mobile media devices, provided the devices are within wireless range. In another example, a mobile media device can transfer personal information to other mobile media devices within wireless range that satisfy predetermined criteria (e.g., rules). For example, mobile media devices can make available personal information, such as characteristics of their users, interests, contact information, etc., and the mobile media devices can examine the predetermined criteria to determine whether information should be transmitted or exchanged with such mobile media devices.

As noted above, a primary mobile device can operate to discover other mobile devices that are nearby through use of a wireless network. Typically, the wireless network is a local wireless network that supports only short-range communications. One example of the short-range can be less than 100 meters. Another example of short-range can be less than 25 meters. Still another example of the short-range can be less than 10 meters. Hence, the availability of another mobile device on the local wireless network signals that such mobile device is within the vicinity of the primary mobile device. In another embodiment, a remote network and a remote server computer can be used to determine when mobile devices are nearby. The locations of the mobile devices can be examined to determine if the devices are nearby. The mobile devices can use global positioning systems (GPS) or network triangulation to determine their positions. The remote network and the remote server can also be used to transfer data between the mobile devices that are nearby. As ex example, the remote network can include a mobile (e.g., cellular) telephone network.

Local Data Sharing

Another aspect of the invention pertains to a local content server. The local content server operates within a local wireless environment. The local content server can be provided at a particular location, such as a business (i.e., establishment), city or other entity for the purpose of wirelessly transmitting data to a nearby mobile device. In other words, when a mobile device is within the vicinity of the local content server that is provided at the particular location, the mobile device is able to transmit/receive data with the local content server. As used herein, "in the vicinity" means a region at or near a location.

In the case of a business, such as a coffee shop, theater or retail store, the business may provide an in-store content server that provides a data access point in a wireless manner. In one example, the business could be normally broadcasting media data (e.g., music or other audio information) to patrons within their business. The media data can be provided locally by a media system (e.g., sound system), which may be part of the local content server. In addition, the local content server can enable additional data to be wirelessly transmitted to the mobile devices of patrons within the business.

As an example, if a sound system were playing music within the business' premises, a patron's mobile device provided within the business' premises could receive information about the song being played by way of a wireless transmission from the local content server to the patron's mobile device. Such information regarding the song being played could then be presented on a display screen of the patron's mobile device for the patron to view. In addition, the display screen on the patron's mobile device can enable the patron to access further information regarding the business or the media being played. This additional information can facilitate the purchase of media or other products or services available from the business. For ease of purchase, a one-click or few clicks option to purchase the media or other products can be made available. Still further, a user could indicate or mark/tag a media item or other product for future consideration for purchase.

As another example, a user of a mobile device may be at a movie theater and may hear or otherwise desire to access a movie soundtrack or video trailer. Given the user's location at the movie theater, the mobile device of the user can receive a wireless transmission (via a local content server) of a soundtrack or video trailer if so desired by the user. Further, a more specific user location at the movie theater (e.g., at a region associated with a first movie) can be used to determine the data to be transmitted to the mobile device of the user. The user may also receive advertisements that are targeted to persons who are generally interested in movies or specifically interested in the movie associated with the soundtrack or video trailer. The advertisements can be presented on the display screen on the mobile device. The user can also purchase tickets for the user at the movie theater using the mobile device.

As yet another example, a city may want to make certain city data readily available to persons within the city. For example, the city may provide a city map with locations of interest to persons within the city by way of a wireless local server. In such a case, a mobile device within city limits would be able to wirelessly receive an electronic version of the city map. A smaller scale implementation can also be provided for a town, community or village.

Regardless of the particular type of entity that the user of a mobile device visits, the location of the user can infer user interest or preferences. For example, when the user is at a movie theater, the user is likely interested in movies. As another example, when the user is at an airport, the user is likely interested in flight arrival and departure times.

The fact that certain patrons in a business' store have mobile devices can also facilitate the business in gathering information on patrons. For example, by interaction with mobile devices of patrons that are in the vicinity of the business' site, the business can receive a profile associated with the patron. In one embodiment, the profile can indicate characteristics of the person, age, salary range, and interest. Other information businesses might receive from the mobile device could be the time the patron was in the store, how frequently the patron visits stores of the business, etc.

In general, content received at a predetermined location can be customized or personalized for the user of the mobile device. For example, the customization or personalization can be based on user preferences, user characteristics, listening habits and/or the environment. For example, if your user preferences or listening habits indicate that you like country music, then, when visiting a business, the business can provide information to your mobile device that is customized or personalized for users that like country music. For example, if the user enters a music store to browse music, the user's mobile device can be presented with information concerning country songs or associated products that may be of interest to the user.

Figure 6A:
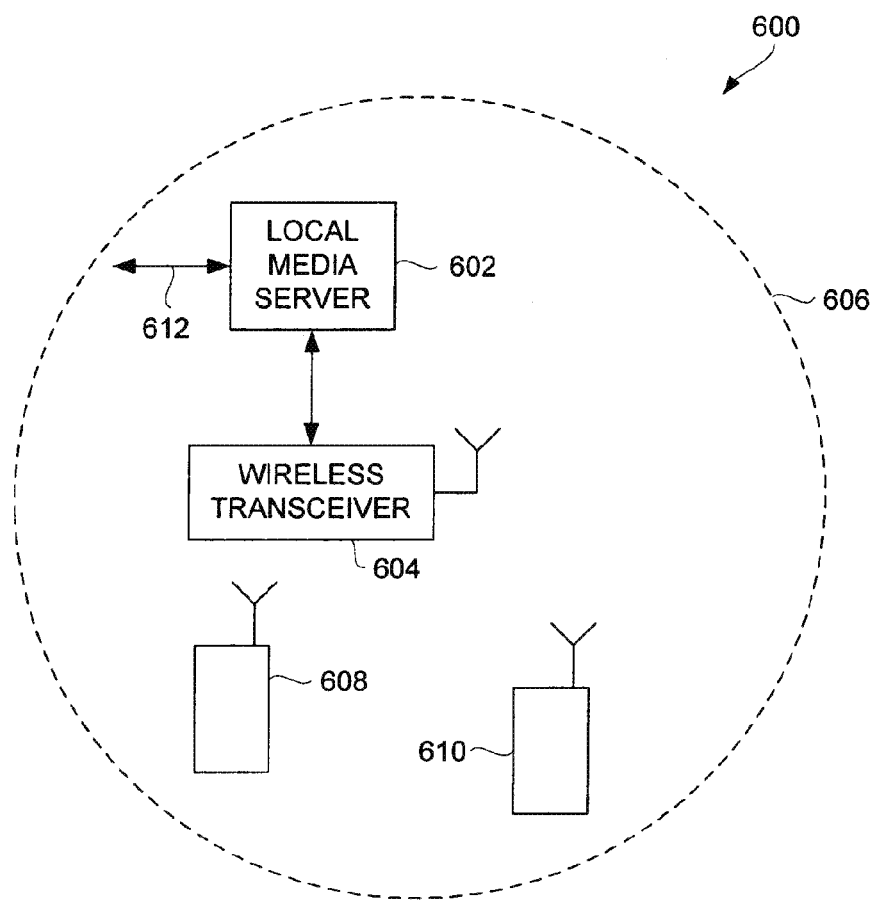
FIG. 6A is a block diagram of a wireless media sharing system according to one embodiment of the invention.

FIG. 6A is a block diagram of a wireless media sharing system 600 according to one embodiment of the invention. The wireless media sharing system 600 includes a local media server 602. The local media server 602 is, for example, suitable for use as the local media server 308 illustrated in FIG. 3. The local media server 602 stores or has access to various media items. A wireless transceiver 604 couples to the local media server 602 and produces a wireless network 606. Wireless communications between the wireless transceiver 604 and mobile devices (wireless devices) 608 and 610 allow the mobile devices 608 and 610 to interact with the local media server 602. More particularly, the wireless transceiver 604 can provide the wireless network 606, and the mobile devices 608 and 610 can interact with the local media server 602 so long as the mobile devices 608 and 610 are within the wireless network 606. Additionally, the local media server 602 can be coupled to a central media server, such as the central media server 301 illustrated in FIG. 3, via a network link 612.

The wireless media sharing system 600 can be provided at a particular venue and offer wireless interaction for users of mobile devices while at the venue. The venue can also participate in co-branding of the media being provided to the mobile devices 608 and 610 at the venue. For example, the venue could be a coffee shop, theater or a retail store. The local media server 602 can provide access to a central media server. The local media server 602 can transfer (e.g., broadcast, anycast or multicast) media to the mobile devices 608 and 610. The local media server 602 can also dynamically determine which media items are to be transmitted (e.g., broadcast) or played at the venue based on the characteristics of the users of the mobile devices 608 and 610 at the venue. Still further, the local media server 602 could also acquire information from users of the mobile devices 608 and 610. For example, the acquired information can pertain to user characteristics, user rating of media items, how long users have been in the store, what portions of the store they found most interesting, and what media items they were receiving (e.g., listening to).

The venue can also facilitate the users of the mobile devices 608 and 610 in buying media content, either from the local media server 602 or a central media server. The local media server 602 can also provide information on what songs or other media is currently playing at the venue, and the mobile devices 608 and 610 can store and/or display such information on a display screen. A user of the mobile devices 608 and 610 can also select, mark or tag a media item they hear or see while in the venue, so that the media item can be automatically purchased, added to an interest list, or available for deferred purchase.

As previously noted, the venue can also gather information concerning the users of the mobile devices 608 and 610. Such information can include when and how often the users were in the venue. Further, different users, based on their preference or criteria settings, can receive different or personalized media content while at the venue. In another embodiment, users could make requests for particular media content, such as through making selection with reference to a user interface for the mobile devices 608 and 610.

The location of the venue and/or the media devices can infer the interest or preferences of the users. For example, if the venue is an airport, a local media server could provide airport arrival and departure information, weather, etc. that a traveler might desire. As another example, if the user is visiting a city (e.g., one that they have not lived in for some time), the local city map may be of interest and available from a local server. As still another example, a venue, such as a movie theater, can provide a local media server that would facilitate the buying of movie tickets or soundtracks and could also make video trailers available.

The local media server 602 together with the wireless transceiver 604 can broadcast or multicast media content to mobile devices 608 and 610. The mobile devices 608 and 610 can also restrict or limit what type of data they permit to be received. For example, the user of the mobile device 608 can enter user preferences that operate to automatically filter out unwanted transmissions from local servers. On the other hand, the local media server 602 can examine the user preferences, criteria or listening habits of a user and then transmit user data that is consistent with their interests.

Figure 6B:
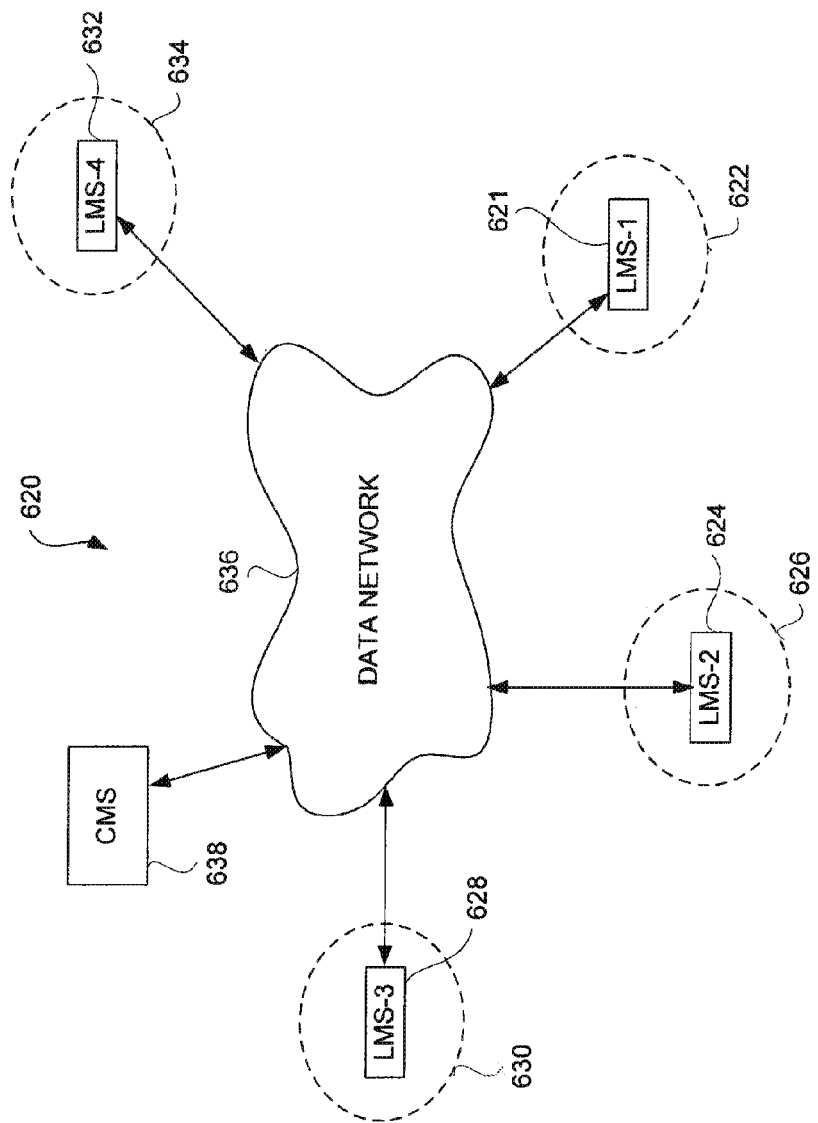
FIG. 6B is a block diagram of a distributed wireless data sharing system according to one embodiment of the invention.

FIG. 6B is a block diagram of a distributed wireless data sharing system 620 according to one embodiment of the invention. The distributed wireless data sharing system 620 can include a plurality of local media systems (LMS) that are provided at different locations, such as at different venues or establishments. In particular, as illustrated in FIG. 6B, the distributed wireless data sharing system 620 includes a first local media system (LMS-1) 621 that provides a wireless environment 622 at a first location; a second local media system (LMS-2) 624 that provides a wireless environment 626 at a second location; a third local media system (LMS-3) 628 that provides a wireless environment 630 at a third location; and a fourth local media system (LMS-4) 632 that provides a wireless environment 634 at a fourth location. Each of the plurality of local media systems 621, 624, 628 and 632 can couple to a data network 636. As an example, the data network can be a local area network, a wide area network or global data network, such as the Internet.

A central media system (CMS) 638 can also be coupled to the data network 636. The central media system 628 can provide centralized storage, sales, management and/or distribution of electronic data, such as media content. Media content can pertain to one or more different types of media, including music, video, audiobooks, podcast, and images. More particularly, any of the local media systems 621, 624, 628 and 632 can interact with the central media system 638 to acquire media content. Then, the local media system 621, 624, 628 and 632 can broadcast, multicast or otherwise deliver media content to mobile electronic devices that are within range of their wireless environments 622, 626, 630 and 634, respectively. In addition, information, such as patron information (e.g., demographics, profile or feedback), acquired at the local media systems 621, 624, 628 and 632 can be provided to the central media system 638. The central media system 638 can use the patron information to better provide data or other services for patrons at the various locations supported by the local media systems 621, 624, 628 and 632.

According to another aspect of the invention, a customized media environment can be provided at an establishment. In one embodiment, the customization is automatic or dynamic so that user or patron interaction may not be needed. In another embodiment, patron interaction can be used to provide the customized media environment.

The customized media environment can be associated with a media store. The media store can be provided at a remote server that is operatively connected to the customized media environment by way of a network. Alternatively, the media store can be provided by the customized media environment itself by way of a local server.

The customized media content can depend upon the patrons within the store, currently or recently or over time (e.g., historically). In this regard, the customized media content for the customized media environment can be different at different establishments, even the same type of establishment in different locations may have different customized media environments. The customization can also be dependent upon the demographics of the customers, time of day, etc. The customization of the media environment can be determined based on what is popular in the associated geographic area. For example, the top 40 media items being purchased (e.g., from an online media store) by persons in the region (e.g., city) of the establishment can be selected as the customized media content for the establishment.

Besides customizing a media environment for a particular establishment, different users or classes of users can be presented with different user interfaces. For example, a child might be presented with a reduced feature interface, whereas a college student may receive a sophisticated user interface with full-featured support.

Although the wireless data sharing systems discussed above in FIGS. 6A and 6B provide a local server or system (e.g., local media server) at an establishment or location, it should be understood that in other embodiments, a server or part of the system could be provided remotely from the establishment or location, yet connected through wired and/or wireless networks. Such remotely provided server or part of the system could also even be used to support data sharing at multiple establishments or locations.

Figure 7:
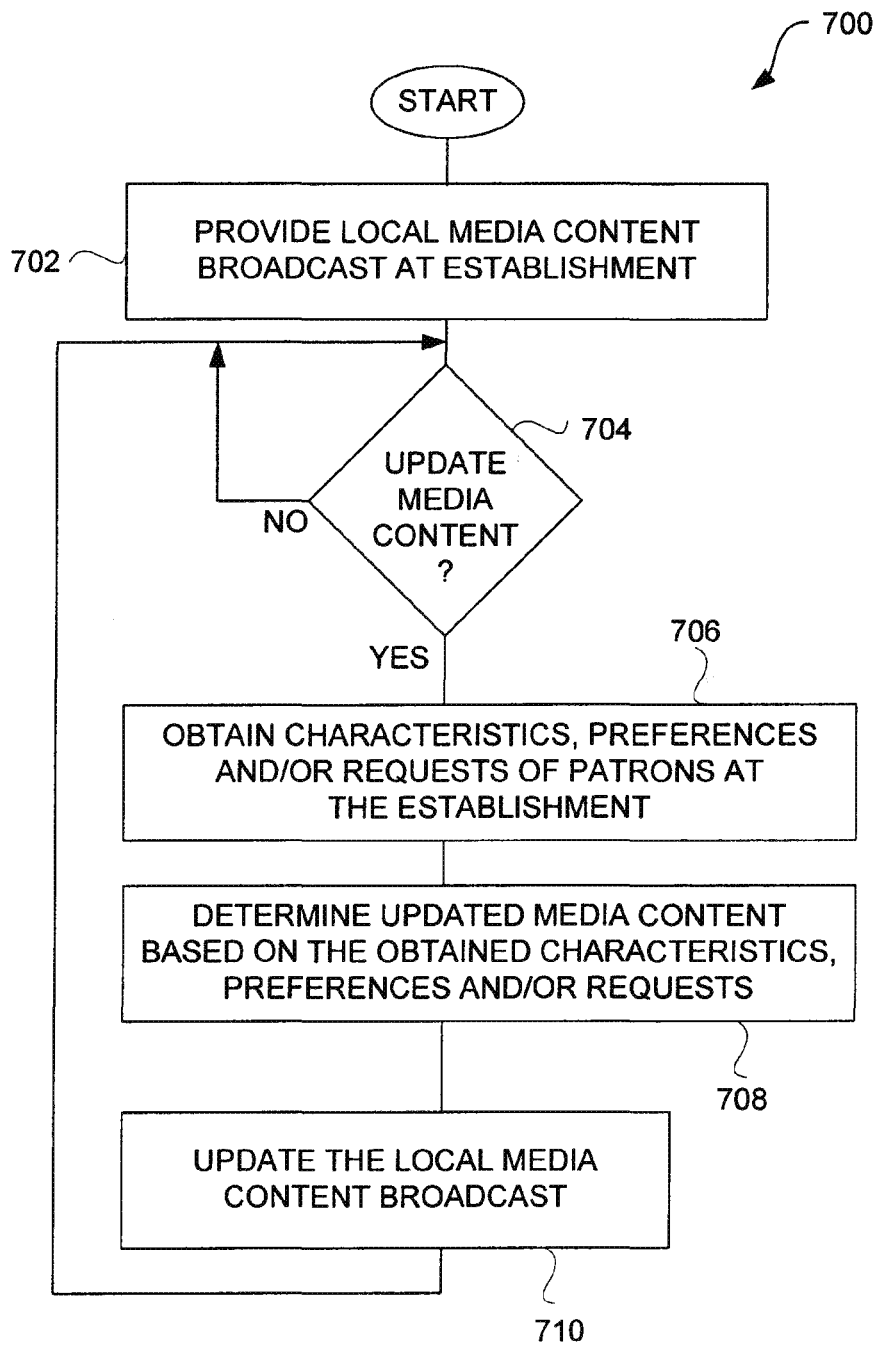
FIG. 7 is a flow diagram of a dynamic media selection process according to one embodiment of the invention.

FIG. 7 is a flow diagram of a dynamic media selection process 700 according to one embodiment of the invention. The dynamic media selection process 700 is, for example, performed by a local media server (e.g., the local media server 602 illustrated in FIG. 6A) or local media system (e.g., any of the local media systems 621, 624, 628 and 632 illustrated in FIG. 6B).

The dynamic media selection process 700 initially provides a local media content broadcast at an establishment. In one embodiment, the local media content can be broadcast by streaming the local media content from a local media server over a localized wireless network provided at the establishment. In another embodiment, the local media content can be broadcast over radio waves, such as localized AM or FM broadcasts. Users or patrons of the establishment that have a wireless electronic device are able to receive the broadcasted local media content via a wireless network or localized AM or FM broadcast. In still another embodiment, the local media content can be broadcast by a media system (e.g., sound system) having media output devices (e.g., speakers) at the establishment.

Once the local media content broadcast is provided 702, a decision 704 can determine whether local media content being broadcasted is to be updated. In other words, the decision 704 determines whether the local media content being broadcast at the establishment should be updated at this time. In one implementation, the media content can be periodically evaluated for an update, such as every ten (10) minutes or some other predetermined period of time. In any case, when the decision 704 determines that media content update should be performed, characteristics, preferences and/or requests of one or more patrons at the establishment are obtained 706. The characteristics, preferences and/or requests are from those patrons at the establishment that have mobile devices (i.e., wireless electronic devices).

After the characteristics, preferences and/or requests of the patrons are obtained 706, updated media content can be determined 708 based on the obtained characteristics, preferences and/or requests. The determination 708 of the updated media content can thus be influenced by the patrons at the establishment. The mobile devices associated with such patrons can interact with a local media server at the establishment to exchange the characteristics, preferences and/or requests. The local media server can then accumulate the characteristics, preferences and/or requests and determine whether an update to the existing media content should be performed. As an example, the media content can be updated to different media content that is more to the liking of the patrons at the establishment. In one embodiment, characteristics, preferences and/or prior requests of patrons can be used to dynamically influence media selection at the establishment without any patron participation. In another embodiment, requests of patrons can be used to influence media selection at the establishment through such patron participation.

After the updated media content has been determined 708, the local media content broadcast at the establishment can be updated 710. The update to the local media content broadcast could be implemented immediately or in a deferred manner. To defer the local media content broadcast update, a media output queue could be utilized to hold the sequence of media content to be broadcast. In any case, following the block 710, the dynamic media selection process 700 returns to repeat the decision 704 and subsequent blocks so that the media content being broadcast can be repeatedly updated.

Figure 8:
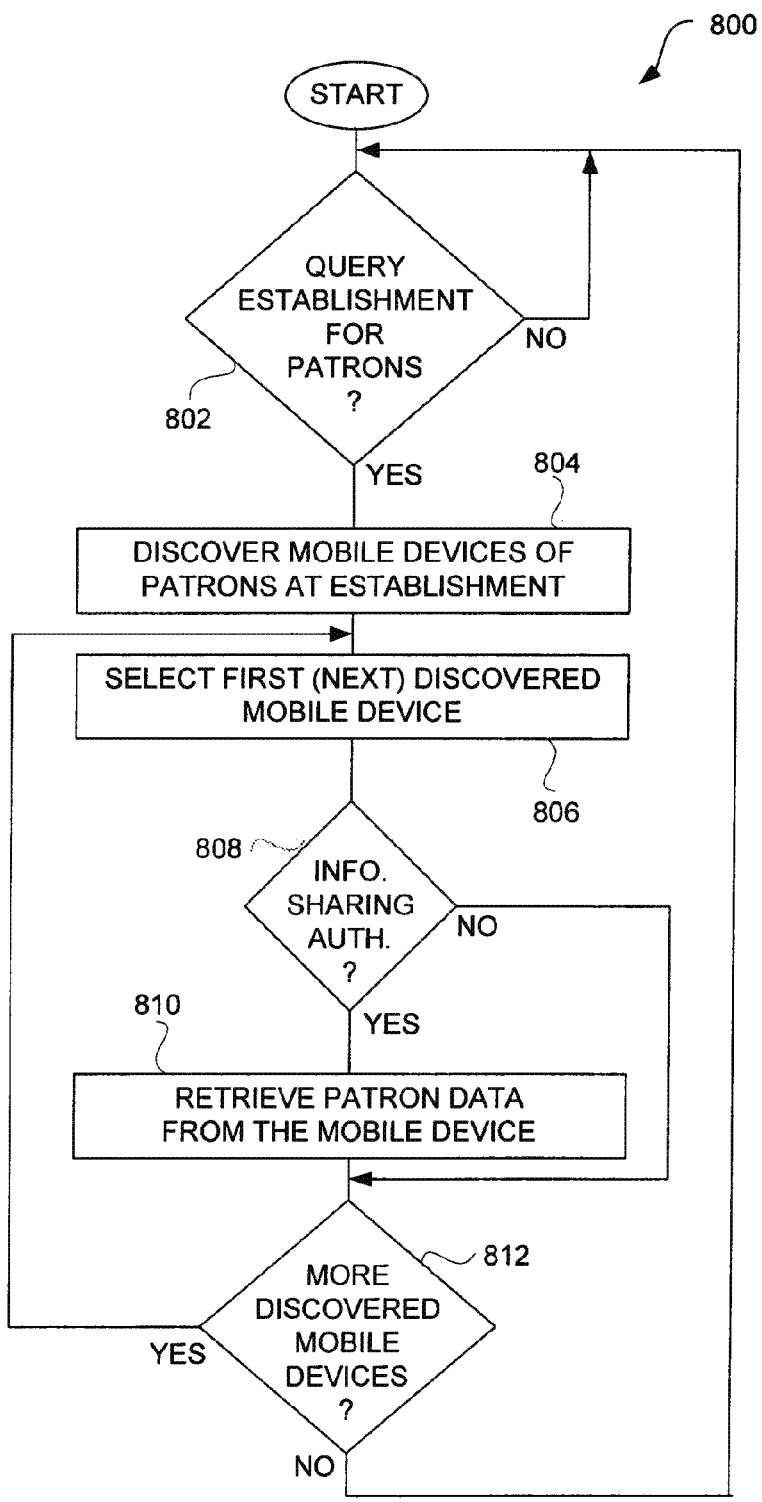
FIG. 8 is a flow diagram of a patron discovery process according to one embodiment of the invention.

FIG. 8 is a flow diagram of a patron discovery process 800 according to one embodiment of the invention. The patron discovery process 800 can, for example, be utilized by the block 706 of the dynamic media selection process 700 illustrated in FIG. 7 to determine those patrons having mobile devices that are at an establishment.

The patron discovery process 800 can begin with a decision 802. The decision 802 determines whether an establishment should be queried for patrons. Typically, the establishment would be queried for its current patrons on a periodic basis. When the decision 802 determines that it is not time to query for patrons, the patron discovery process 800 waits for the appropriate time. On the other hand, when the decision 802 determines that it is an appropriate time to query the establishment for patrons, mobile devices of patrons at the establishment are discovered 804. Typically, mobile devices that support wireless interaction can be discovered 804 if they are in range of a wireless access point provided at the establishment. In one embodiment, the range of the wireless access point includes at least a substantial part of the establishment. In another embodiment, the range of the wireless access point further includes the vicinity of the establishment. Here, well known network discovery techniques can be used to locate the mobile devices (with wireless capabilities) that are located at the establishment. The mobile devices can vary. As an example, the mobile devices can include portable media players, mobile phones, personal digital assistants (PDAs), portable game players, etc.

Once the mobile devices are discovered 804, information can be acquired from the mobile devices that can be utilized by a local media server at the establishment. In particular, a first discovered mobile device can be initially selected 806. A decision 806 can then determine whether information sharing has been authorized by the patron associated with the mobile device. In this embodiment, a patron (user) of a mobile device is given the option of participating or declining participation in information sharing.

When the decision 808 determines that information sharing has been authorized, then patron data can be retrieved 810 from the mobile device. The patron data can refer to characteristics, preferences and/or requests of a patron that are stored in the mobile device associated with the patron. On the other hand, when the decision 808 determines that information sharing has not been authorized, then the block 810 is bypassed because the patron has not authorized sharing of its patron data.

In any case, following the block 810 or following the decision 808 when the block 810 is being bypassed, a decision 812 determines whether more discovered mobile devices are to be processed. When the decision 812 determines that there are more mobile devices to be processed, the patron discovery process 800 returns to repeat the block 806 so that a next discovered mobile device can be selected and similarly processed. Alternatively, when the decision 812 determines that no more discovered mobile devices are to be processed, the patron discovery process 800 returns to repeat the block 802 so that the patron discovery process 800 can repeat its processing, typically on a periodic basis.

Another aspect of the invention is an establishment that provides a plurality of broadcasts. The broadcasts are local to the establishment. When a user of a mobile device enters an establishment, the user can receive a plurality of broadcasts that are made available by the establishment. Typically, the establishment would utilize a media delivery server at the establishment to provide the one or more broadcasts over a wireless data network. As an example, the mobile device of the user can present a graphical user interface that identifies the available broadcasts at the establishment and allows the user to select the desired broadcast. As another example, the mobile device of the user could alternatively automatically select from the available broadcast based on preferences, user history or the like. These broadcasts can also be implemented as multicasts.

Figure 9:
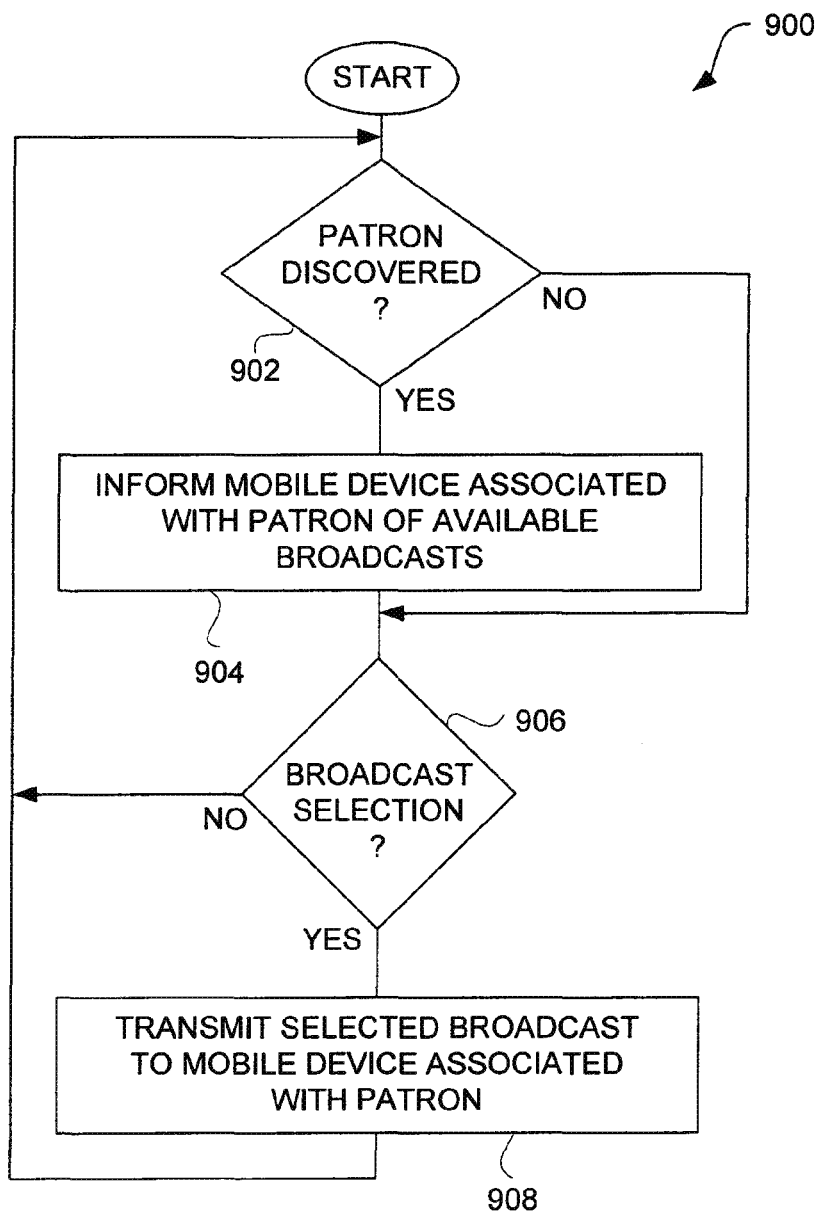
FIG. 9 is a flow diagram of a broadcast selection process according to one embodiment of the invention.

FIG. 9 is a flow diagram of a broadcast selection process 900 according to one embodiment of the invention. The broadcast selection process 900 can operate to permit a patron at an establishment to select one of a plurality of available broadcasts made available at the establishment. The broadcast selection process 900 is, for example, performed by a local media server (e.g., the local media server 602 illustrated in FIG. 6A) or local media system (e.g., any of the local media systems 621, 624, 628 and 632 illustrated in FIG. 6B).

Figure 10:
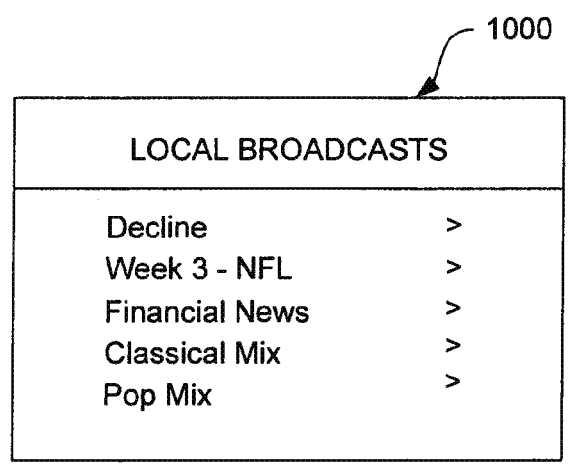
FIG. 10 illustrates an exemplary local broadcast screen according to one embodiment of the invention.

The broadcast selection process 900 begins with a decision 902 that determines whether a patron has been discovered. Here, when the patron has an electronic device (mobile device), a local server at the establishment can discover the presence of the electronic device at the establishment. Hence, once the decision 902 determines that a patron has been discovered, the mobile device associated with the patron can be informed 904 of the available broadcasts at the establishment. In another embodiment, an establishment may offer a plurality of concurrent broadcasts of different data. Here, in one embodiment, the local server can wirelessly transmit a list of the available broadcasts. In one example, the list can be provided as a markup language document (e.g., XML document) containing descriptive data (e.g., metadata) pertaining to the available broadcasts. The mobile device can interpret the markup language document to present local broadcast information on a display of the mobile device. FIG. 10, which is described below, provides an example of a presentation of local broadcast information on a display.

After the mobile device associated with the patron has been informed 904 of the available broadcast, a decision 906 can determine whether a broadcast selection has been made. Here, the patron may select one of the available broadcasts to receive while at the establishment. For example, the broadcast selection can be made with respect to local broadcast information being presented on the display of the mobile device. As a particular example, a user can interact with a user interface associated with the mobile device to select one of the available local broadcasts. Such selection can utilize a button, dial, touch surface, voice or other user input means of the mobile device. When the decision 906 determines that a broadcast selection has not been made, then it is assumed that the patron has declined to receive any of the available broadcasts. In this case, the broadcast selection process 900 returns to repeat the decision 902 and subsequent blocks so that the broadcast selection process 900 can be repeated for each discovered patron.

On the other hand, when the patron does select one of the available local broadcasts, the selected broadcast can be transmitted 908 to the mobile device associated with the patron. Typically, a local media server provided at the establishment would configure its wireless transmission such that the selected broadcast is wirelessly transmitted via a wireless network to the mobile device associated with the patron while in the vicinity of the establishment. In this manner, the mobile device is able to receive the selected broadcast and present the media content or other data associated therewith to the patron, who is the user of the mobile device. Following the block 908, the broadcast selection process 900 returns to repeat the decision 902 and subsequent blocks so that the broadcast selection process 900 can be repeated for each discovered patron. To the extent that multiple mobile devices are to receive the same broadcast, the transmission of the selected broadcast can be implemented by broadcasting or multicasting for efficient data transmission.

FIG. 10 illustrates an exemplary local broadcast screen 1000 according to one embodiment of the invention. The local broadcast screen can represent a screen being displayed on a display of a mobile device associated with a patron. The local broadcast screen 1000 can thus inform the patron of the local broadcasts that are available. In this example, the patron is informed that the establishment is presently offering four different local broadcasts, namely, "Week 3—NFL", "Financial News", "Classical Mix", and "Pop Mix". In addition, the local broadcast screen 1000 indicates a "Decline" selection as also being available in the event that the patron desires to decline to receive any of the local broadcasts. The patron can interact with the local broadcast screen 1000 to either select one of the available local broadcasts or to decline the broadcasts.

Figure 11A:
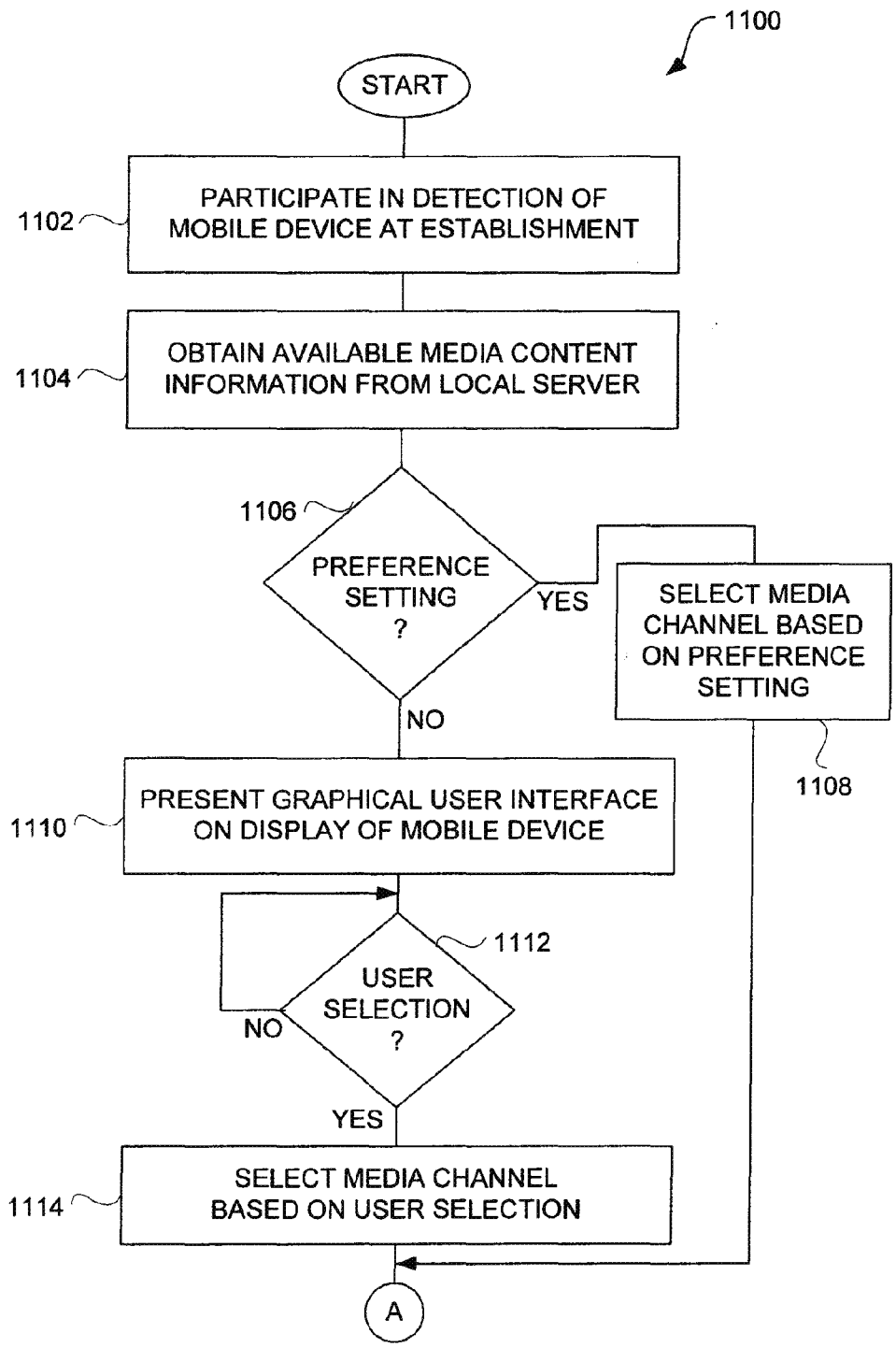
FIGS. 11A and 11B are flow diagrams of a media channel selection process according to one embodiment of the invention.
Figure 11B:
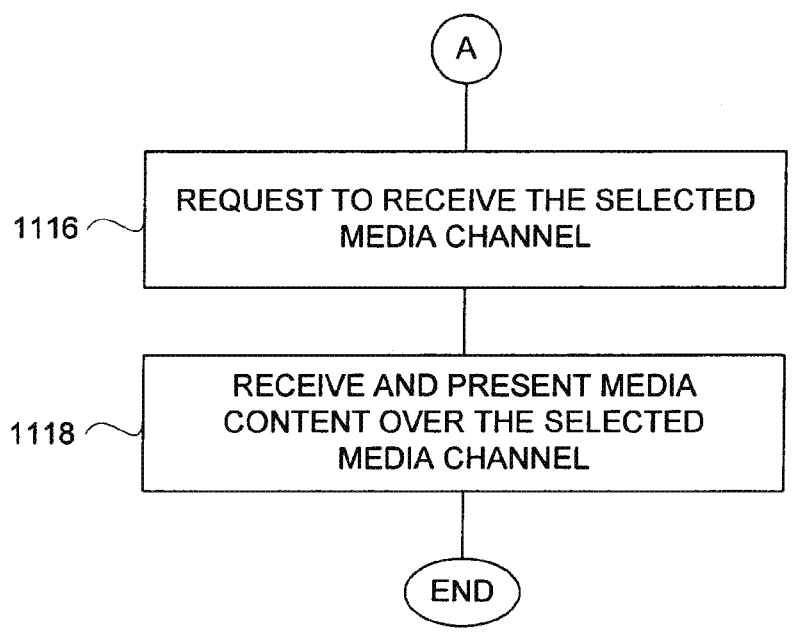

FIGS. 11A and 11B are flow diagrams of a media channel selection process 1100 according to one embodiment of the invention. The media channel selection process 1100 is, for example, performed by a mobile device (i.e., wireless electronic device), such as the mobile device 608 or the mobile device 610 illustrated in FIG. 6A.

The media channel selection process 1100 initially participates 1102 in detection of a mobile device (associated with a patron) at an establishment (or venue). Typically, the mobile device would be detected by a local server shortly after the patron enters the establishment. Next, available media content information is obtained 1104 from the local server. Typically, the available media content information would be obtained 1104 by wireless interaction of the mobile device with the local server. Then, a decision 1106 determines whether a preference setting associated with the patron or the mobile device influences the media channel selection. When the decision 1106 determines that a preference setting does influence the media channel selection, the media channel is selected 1108 based on the preference setting.

On the other hand, when the decision 1106 determines that there is no preference setting that affects the media channel selection, a graphical user interface is presented 1110 on a display of the mobile device. As an example, the graphical user interface being presented 1110 is a display screen that presents to the user indications (e.g., titles, abstracts, summaries, or images) of one or more media channels that are available at the establishment for selection. Next, a decision 1112 determines whether a user selection has been made. Here, the user selection can correspond to selection of one of the available media channels as indicated on the graphical user interface. Once the decision 1112 determines that a user selection has been made, a media channel can be selected 1114 based on the user selection.

Following the block 1108 or the block 1114, the mobile device can request 1116 to receive the selected media channel. Here, the request 1116 to receive the selected media channel is provided to the local server. In response to the request 1116, the mobile device can receive and present 1118 media content over the selected media channel. The media content being received over the selected media channel can be provided to the mobile device in a wireless manner, such as through streaming. As an example, the media content being received can be audio or video data being streamed to the mobile device over a wireless data network. Following the block 1118, the media channel selection process 1100 ends. However, it should be recognized that the media channel selection process 1100 can be repeated each time a patron is discovered at the establishment.

Although the media channel selection process 1100 primarily concerns delivering media content associated with a selected media channel to a mobile device, other electronic data can be exchanged between the local server and the mobile device. As examples, the mobile device can optionally also interact with the local server to provide feedback to the local server, obtain information on other topics of interest from the local server, receive product or service information associated with products or services offered by the establishment, etc. For example, current sales or coupons at the establishment can be made available to the mobile device by the local server. Such other electronic data can thus facilitate ecommerce transactions for products or services offered at the establishment.

According to another aspect of the invention, an establishment provides local replay of specific data. The specific data can provide a replay of a previously recorded media item, such as an audio or video recording. For example, the replay can pertain to a recent sporting event or current news, which can be in audio or video formats. The patron to the establishment can receive the local replay via wireless means to their mobile device. In one embodiment, the specific data for the replay can be provided by a local transmission or a media channel as discussed above. In an alternative embodiment, the patron can physically connect their mobile device to a port provided at the establishments to receive the specific data by a wired means.

According to another aspect of the invention, an establishment (such as a store) can allow users with mobile devices to either influence digital content being locally transmitted at the vicinity of the establishment or permit users to request certain digital content be locally transmitted or otherwise made available. The digital content can be media content. In one embodiment, the digital content can be transmitted by streaming data from a local server over a localized wireless network provided at the establishment to one or more mobile devices of patrons. In another embodiment, the digital content can be broadcast over radio waves, such as localized AM or FM broadcasts, to mobile devices of patrons that are within the vicinity of the establishment. In still another embodiment, the digital content can be broadcast by a media system (e.g., sound system) having media output devices (e.g., speakers) at the establishment.

In one embodiment, the establishment can provide a data delivery server (e.g., local server) which can operate as a jukebox. A patron to the establishment can influence the data being presented (i.e., served) by the data delivery server. In one embodiment, the media content can be influenced by the mobile devices of patrons within the establishment. For example, if a substantial percentage of the media devices associated with patrons that are fond of country music, the media content being transmitted (e.g., broadcast) by the data delivery server can provide country related media (e.g., country music). In one implementation, a patron within the establishment can influence the media content through one or more preferences that have been previously saved on their mobile device. In another implementation, a patron within the establishment can influence the media content by interaction with the data delivery server. As an example, the patron can be presented with a menu on their mobile device. Through interaction with the menu, the patron can signal the data delivery server of the particular digital content that the patron would prefer to receive (e.g., hear) while in the establishment.

In the case in which there are multiple patrons attempting to influence the digital content being delivered at the establishment, the data delivery server can operate to determine the particular digital content to be delivered. For example, the data delivery server could determine that it will automatically determine the data to be delivered based upon the preferences or interests of the patrons with mobile devices within the establishment. Here, the system can automatically adjust the digital content being delivered based upon the preferences or interests of its patrons. As another example, when a user is providing explicit data delivery request, such as through menu interaction as noted above, the data delivery server can operate to place a particular data item (e.g., media item) in a delivery queue. The particular data item can be specifically selected by the patron or can be pseudo randomly selected by the data delivery server based on more general criteria provided by the patron. The data delivery server can output the data item in accordance with the delivery queue. The influence on the data delivery can be used in selecting the particular media items or classes of media items. The user influence or specific requests can be based on types of music, news, sports, etc. For example, if a substantial portion of the patrons want to listen to sports, as opposed to music, the data delivery server could transition to provide sports related content.

Another aspect of the invention is a subscription service for data, such as music or sports data. As an example, the subscription service can be associated with a user that has a mobile device. As the user and the mobile device enter an establishment, the establishment can recognize the user as a member of the subscription service and then permit (on-demand or automatically) delivery of data to the mobile device. Normally, the data delivery would be wireless. The data being delivered can be periodically made available, such as daily or weekly. For example, a user can visit a particular establishment on a weekly basis and when they visit the establishment they can receive the weekly data (data for the week). As a more specific example, if the establishment pertains to a chain of coffee shops, when the user (that is a subscriber) visits any of the coffee shops, they can receive the weekly data. For example, the weekly data can pertain to a song of the week, sports highlights for the week, financial news for the week, etc. The weekly data can be in the form of a media item. This type of system allows for the convenient distribution of data to mobile users, while at the same time encouraging such mobile users to visit certain establishments.

In another embodiment, a user (patron) may have acquired (e.g., purchased) a subscription service to receive certain digital data. The digital content associated with the subscription can be obtained when the user (patron) visits an establishment that supports the subscription service.

Figure 12:
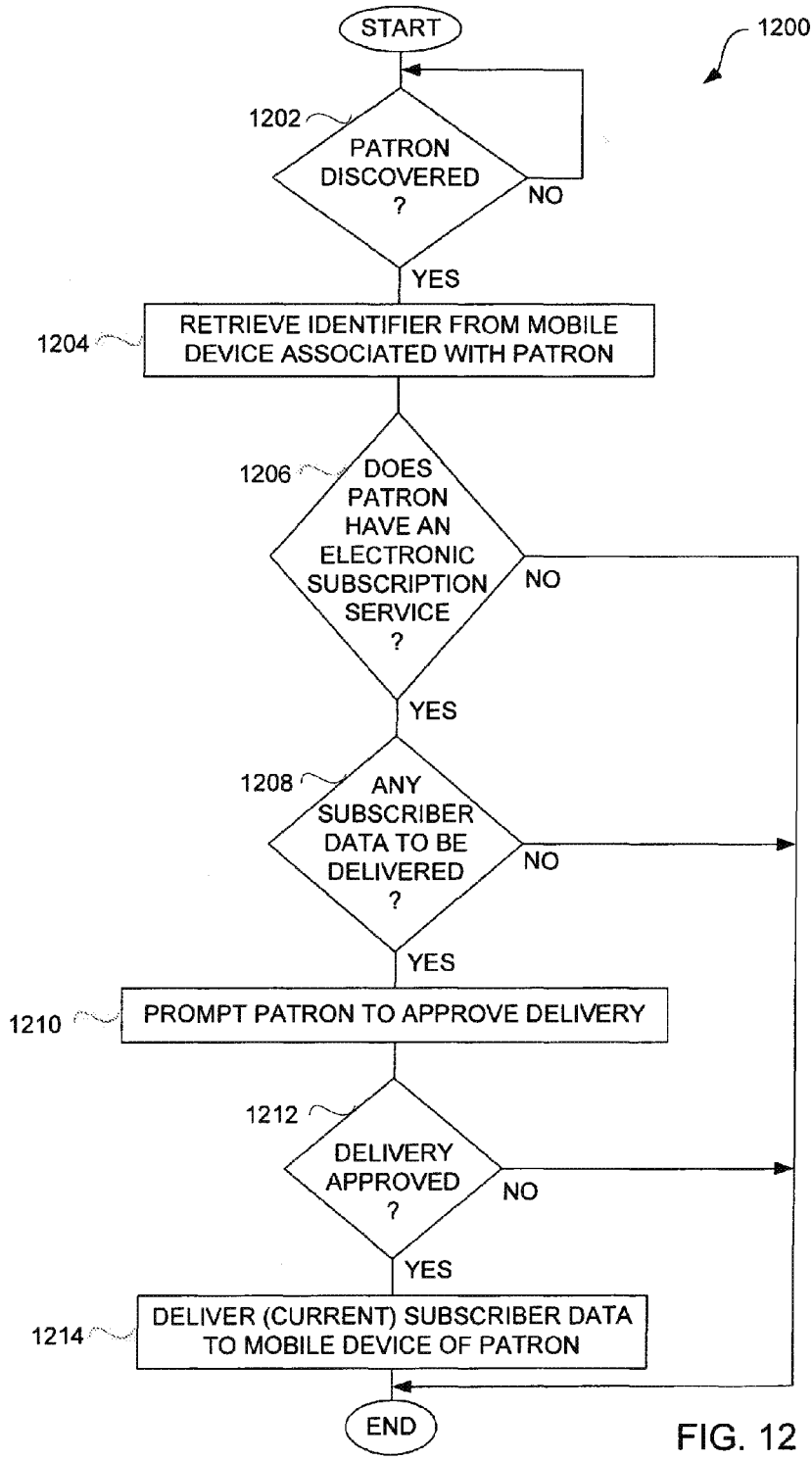
FIG. 12 is a flow diagram of a subscription data delivery process according to one embodiment of the invention.

FIG. 12 is a flow diagram of a subscription data delivery process 1200 according to one embodiment of the invention. The subscription data delivery process 1200 allows a user of a mobile device to subscribe to an electronic subscription service to receive data in a periodic manner. As an example, the subscription service can pertain to a weekly or daily media service that respectively provides daily or weekly media content of interest to the user. As discussed below, the establishment can provide a local server to facilitate the delivery of the subscription data to mobile devices associated with users (patrons). The user of the mobile device becomes a patron at an establishment when the user enters the vicinity of the establishment. According to the subscription, the media content is made available in accordance with the periodic nature of the subscription. Consequently, the user is motivated to visit a participating establishment periodically so as to receive the subscription data.

The subscription data delivery process 1200 begins with a decision 1202 that determines whether a patron has been discovered at the establishment. Typically, a patron can be discovered at the establishment by discovering a mobile device associated with the patron in the vicinity of the establishment using a wireless network provided by the establishment. When the decision 1202 determines that a patron has not been discovered, the subscription data delivery process 1200 awaits the discovery of a patron. Once the decision 1202 determines that a patron has been discovered, an identifier from the mobile device associated with the patron can be retrieved 1204. Then, a decision 1206 can determine whether the patron has an electronic subscription service. Here, the decision 1206 can be performed by a server, such as the local server or a remote server, to determine whether the patron, as identified by the identifier, has an electronic subscription service that is supported by the local server at the establishment. When the decision 1206 determines that the patron does have an electronic subscription service that is supported by the local server at the establishment, a decision 1208 determines whether there is any subscriber data to be delivered to the patron at this time. When the decision 1208 determines that there is subscriber data to be delivered, the patron can be prompted 1210 to approve delivery of the subscriber data. For example, the patron may choose not to receive the subscriber data during this visit to the establishment. Alternatively, the patron could configure their mobile device to automatically approve the delivery of such data. In any case, when the decision 1212 determines that delivery is approved, the subscriber data, namely, current subscriber data, is delivered 1214 to the mobile device of the patron. Typically, the local server would download or stream the subscriber data to the mobile device. On the other hand, no subscriber data is delivered to the mobile device of the patron if the decision 1212 determines that delivery is not approved as well as when there is no subscriber data to be delivered. Hence, following the block 1214, as well as following the decisions 1206, 1208 and 1212 when the tested condition is not present, the subscription data delivery process 1200 ends for the particular patron that has been discovered. Although the subscription data delivery process 1200 ends, the subscription data delivery process 1200 can repeat its processing each time a patron is discovered.

Figure 13A:
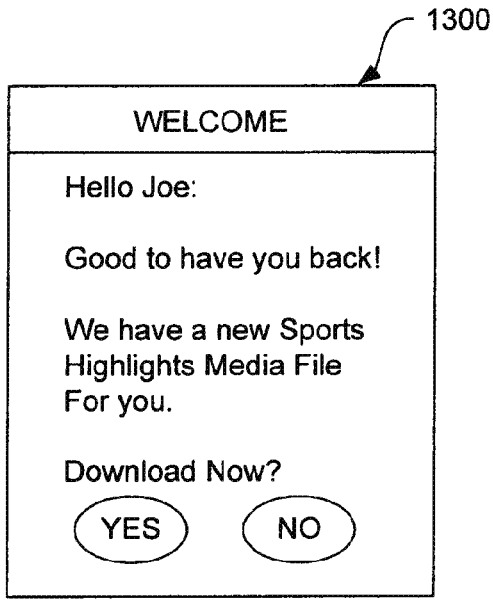
FIG. 13A is an exemplary subscription data availability screen according to one embodiment of the invention.

FIG. 13A is an exemplary subscription data availability screen 1300 according to one embodiment of the invention. The subscription data availability screen 1300 can represent a screen being displayed on a display of a mobile device associated with a patron. The subscription data availability screen 1300 can be presented to a patron to approve or decline delivery of subscription data (e.g., new Sports Highlights Media File). The subscription data availability screen 1300 can be used to prompt the patron for approval at block 1210 of the subscription data delivery process 1200.

Figure 13B:
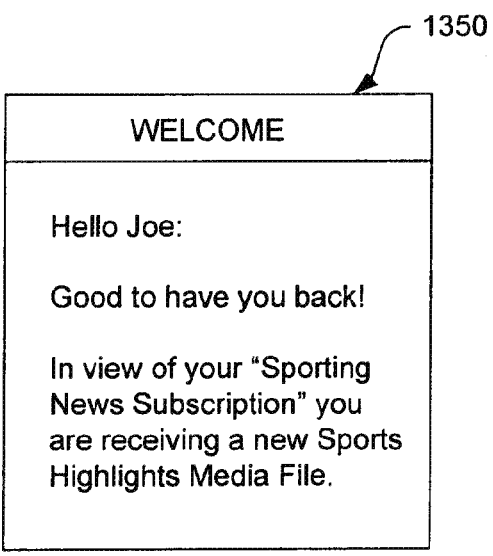
FIG. 13B is an exemplary subscription data availability screen according to another embodiment of the invention.

FIG. 13B is an exemplary subscription data availability screen 1350 according to another embodiment of the invention. The subscription data availability screen 1350 can represent a screen being displayed on a display of a mobile device associated with a patron. The subscription data availability screen 1300 can be presented to a patron to inform the patron that subscription data (e.g., new Sports Highlights Media File) is being sent to the mobile device. The subscription data availability screen 1350 can be used when the mobile device or a subscription account has been configured to automatically deliver the subscription data. Automatic delivery of subscription data can be performed by the subscription data delivery process 1200 by bypassing blocks 1210 and 1212.

Figure 14:
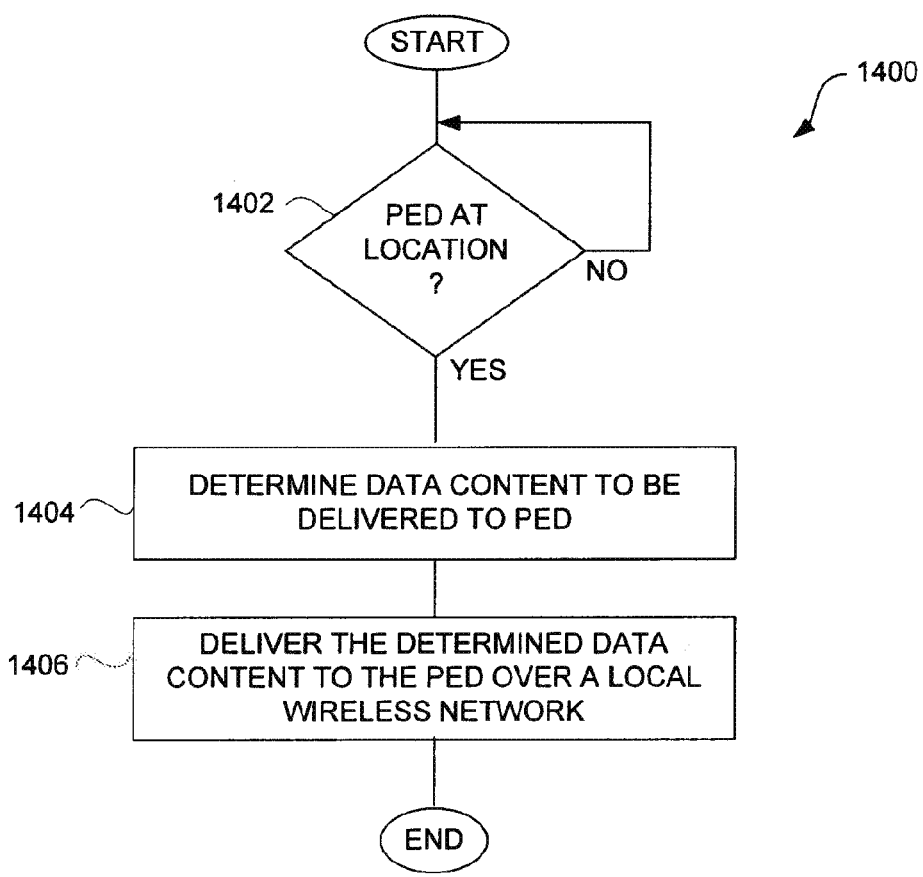
FIG. 14 is a flow diagram of a localized data delivery process according to one embodiment of the invention.

FIG. 14 is a flow diagram of a localized data delivery process 1400 according to one embodiment of the invention. The localized data delivery process 1400 can operate to permit a patron at a location (e.g., an establishment, venue, etc.) to obtain (automatically or manually) localized data (i.e., data pertaining to the location). The localized data delivery process 1400 is, for example, performed by a local server (e.g., the local media server 602 illustrated in FIG. 6A) or local media system (i.e., any of the local media systems 621, 624, 628 and 632 illustrated in FIG. 6B).

The localized data delivery process 1400 begins with a decision 1402. The decision 1402 determines whether a portable electronic device is present at the location. The location is the location of the local server or the local media server that is performing the localized data delivery process 1400. For example, the location can be associated with a restaurant, an airport, an office complex, an amusement park, a theater, a shopping mall, and the like. Typically, the location can be considered an establishment or a venue. Once the decision 1402 determines that the portable electronic device is present at the location, data content to be delivered to the portable electronic device is determined 1404. Next, the determined data content is delivered 1406 to the portable electronic device over a local wireless network. Note that the delivery 1406 of the determined data content is performed over a local wireless network. Hence, the delivery of the determined data content is typically only available so long as the portable electronic device remains within the range of the local wireless network. Typically, the range of a local wireless network is substantially commensurate with the establishment or venue at the location. Following the block 1406, the localized data delivery process 1400 ends.

Still another aspect of the invention pertains to a user interface, namely, a graphical user interface, for a mobile device. The graphical user interface can be dependent upon the location of the mobile device. For example, if the user of the mobile device is presently at an airport, the graphical user interface being presented to the user can present information that would be of interest to the air traveler. In one embodiment, the airport includes one or more local servers that provide the information to the mobile device. Alternatively, a remotely located centralized server can provide the information to the mobile device by way of a wireless access point at the airport. Moreover, as the user moves to different geographic locations, the graphical user interface being presented can change. For example, if the user is later at a stadium watching a football game, the graphical user interface can provide information pertaining to the sport being played at the stadium.

Graphical User Interface

Still another aspect of the invention pertains to graphical user interfaces that can be provided to facilitate delivery, exchange or sharing of data. A media management application operating on the mobile device would typically provide the graphical user interface on a small display screen available on the mobile device. Several graphical user interfaces have been discussed above.

The graphical user interface would assist a user of the mobile device in interacting with the mobile device. For example, the user interface would facilitate navigation of locally stored media as well as remotely stored media. The user interface could provide sharing controls. These sharing controls would facilitate a user in sharing items with one or more other devices. For example, these sharing controls can enable a user to set preference settings and/or present or respond to dialogs for user interaction. For example, a preference setting could allow a user to automatically permit certain types of sharing. Such sharing can be restricted to certain users or be dependent on various conditions. As another example, a user dialog could request permission to share media content with another user or mobile device.

In one embodiment, the graphical user interface can also facilitate a history list. A history list can maintain a list of media items that a user of a mobile device has heard during a period of time. The history list can also record where you heard the media items. For example, if the media item was being transmitted (e.g., broadcasted) at a retail establishment by a local media server, the history list could record that the media item was heard while you were at the retail establishment. The history list can also record information such as where the user has been and when. The history list can also indicate who, what, where and when the mobile device has been interacting. The history list can also be searchable and uploadable to a computing device.

The user interface can also facilitate providing a shopping list. For example, a shopping list can be a virtual list that is maintained by a media device or a personal computer or a server for the benefit of a particular user. Typically, the user has a user account and the shopping list can be associated with that user account. A user of a device can interact with a user interface to add or remove items from the shopping list. The shopping list can be synchronized with various different devices associated with the user. Hence, the shopping list can be available from any of such devices. The shopping list can also facilitate ecommerce in that a purchase of items from the shopping list can be done in a simple and user-friendly manner.

As previously noted, a mobile device can receive data in a wireless manner from another mobile device or a wireless content server. The data being received can be stored at the mobile device and/or presented on a display screen of the mobile device. The data received can specify how information is to be displayed on the mobile device. Regardless, the information can be presented on the display as a graphical user interface. In addition, to facilitate purchase of any of the items on the interest list or on the shopping list, the user interface presented on the mobile device (or other device) can accommodate electronic commerce.

In one embodiment, the mobile device can support an interest list associated with the user of the mobile device. The interest list can enable the user of the mobile device to manually select items from the display screen that are of interest to the user. The user interface can also facilitate bookmarking, tagging or other user actions to indicate interest in a particular item. For example, if upon entering a business the user hears a song being played that is of interest, the user can interact with the mobile device (e.g., display screen) to indicate that a description of the song should be added to his/her interest list. The extent of the user's interest can also be noted. For example, the interest could be high such that the user wants the song to be automatically purchased for their use. On the other hand, the interest could be moderate such that the user wants to remember the song and possibly buy it at a later point in time.

In one embodiment, the interest list is a shopping list or a part thereof. The interest list can be shared amongst a plurality of different computing devices associated with the user. For example, if the user has a stationary computer, the interest list can be synchronized with an interest list at the mobile device. The interest list, like the history list, can be searchable and uploadable.

Further, the graphical user interface for the mobile device can also facilitate various user controls for data sharing. In other words, the user of a mobile device may want to control the nature and extent of data sharing that can be performed with his/her mobile device. The sharing controls, for example, can enable a user to designate items as shareable or not shareable, designate groups of persons to receive certain shareable information, set various preference settings, and/or provide permission (e.g., via dialog screens) to perform data sharing with another.

Although the graphical user interfaces are primarily associated with mobile devices that provide display screens, the graphical user interfaces could be used with other electronic devices (e.g., computers).

Remote Media Update

Another aspect of the invention pertains to techniques for updating media on a mobile device. In one embodiment, a remote shuffle operation can be performed with respect to media items stored on a mobile device, such as a portable media player.

Figure 15A:
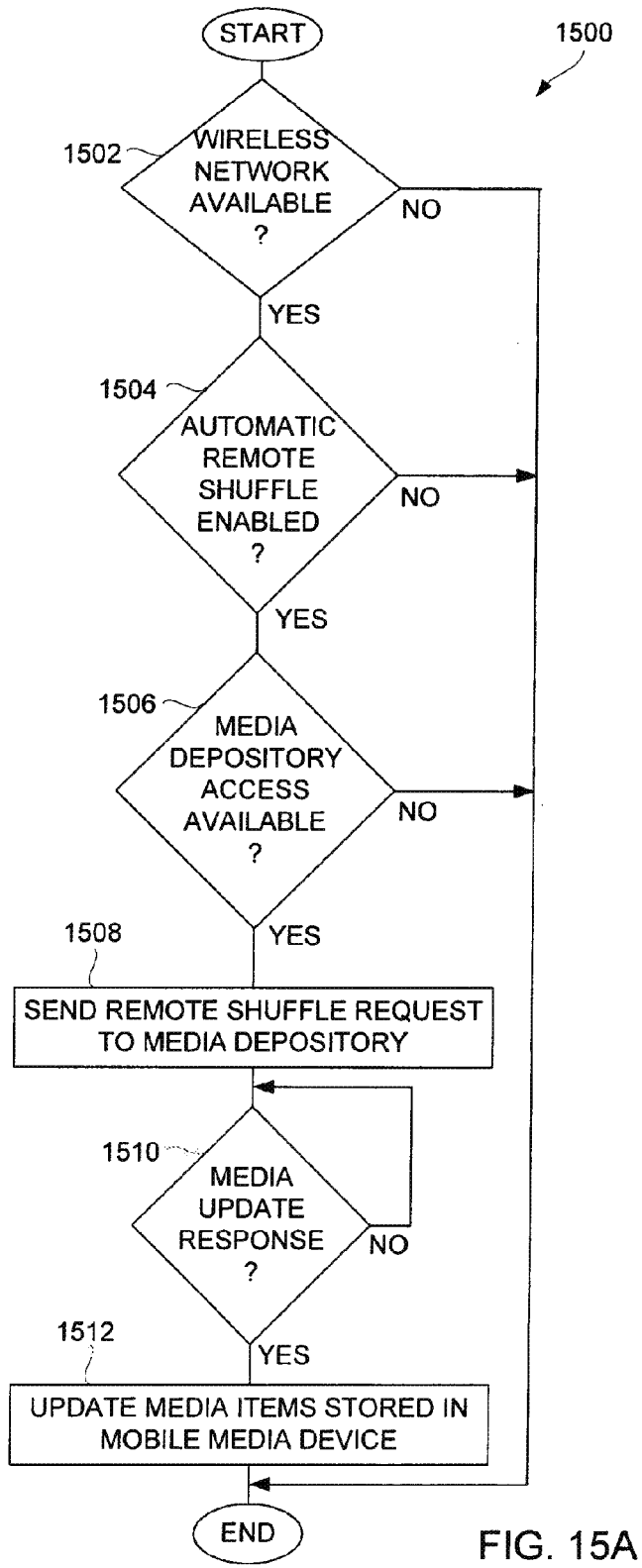
FIG. 15A is a flow diagram of a mobile media update process according to one embodiment of the invention.

FIG. 15A is a flow diagram of a mobile media update process 1500 according to one embodiment of the invention. The mobile media update process 1500 is, for example, performed by a mobile media device (e.g., portable media player) when in the presence of a wireless network that facilitates Internet connectivity.

The mobile media update process 1500 begins with a decision 1502 that determines whether a wireless network is available. Here, the decision 1502 determines whether the mobile media device is in the presence of a wireless network such that the mobile media device can utilize the wireless network. When the decision 1502 determines that a wireless network is available, a decision 1504 determines whether automatic remote shuffle has been enabled. In one embodiment, a preference setting for the mobile media device can enable/disable automatic remote shuffle. When the decision 1504 determines that automatic remote shuffle has been enabled, a decision 1506 determines whether media depository access is available. Here, a media depository stores a plurality of media items. Typically, the media depository supports access from a plurality of users that have registered accounts with the media depository. In one embodiment, the media depository is a media server that includes data storage and/or access to a data storage device. For example, with reference to FIG. 3, the media depository could pertain to the central media server 301, the personal computer 304 or the local media server 308.

When the decision 1506 determines that the mobile media device has access to the media depository, a remote shuffle request is sent 1508 from the mobile media device to the media depository. Here, the mobile media device transmits the remote shuffle request to the media depository via the wireless network as well as potentially other networks, e.g., a wired network. After the remote shuffle request has been sent 1508, a decision 1510 determines whether a media update response has been received.

In response to the remote shuffle request, the media depository produces a media update response after receiving and processing the remote shuffle request. The media update response contains one or more media items. The one or more media items provided with the media update response are typically dependent upon the account associated with the mobile media device or its user. For example, the account may indicate that only a subset of the generally available media items are permitted to be utilized by the account holder. In such case, the one or more media items provided in or with the media update response are limited to those media items for which the account holder is authorized. Additionally, the selection of the one or more media items to be provided in the media update response can be dependent upon a wide range of factors or criteria. For example, user ratings, play counts, genre, play history, time and location can all be used to influence those media items that are provided in the media update response. The media update response can also contain one or more instructions for the mobile media device. For example, the instructions can direct the deletion of certain or all the media items previously stored on the mobile media device. More particularly, prior to storing new media items, previously stored media items would normally be deleted to free-up data storage space for the new media items.

Once the decision 1510 determines that a media update response has been received, the media items stored in the mobile media device are updated 1512 in accordance with the media update response. Here, the media update response can include the media items or can include references to the media items. In any case, the media items themselves are stored in the mobile media device during the update 1512. Following the block 1512, the mobile media update process 1500 ends.

Alternatively, the mobile media device is not updated when the wireless network is unavailable, when the automatic remote shuffle is disabled or when the media depository access is not available. In such cases, the mobile update process 1500 ends without any media update.

Figure 15B:
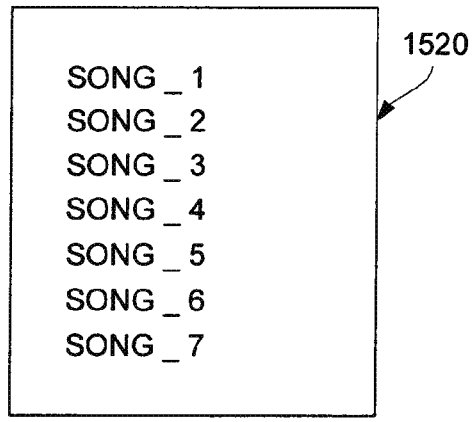
FIG. 15B illustrates an exemplary representation of an existing set of media items stored in a mobile media device according to one embodiment of the invention.
Figure 15C:
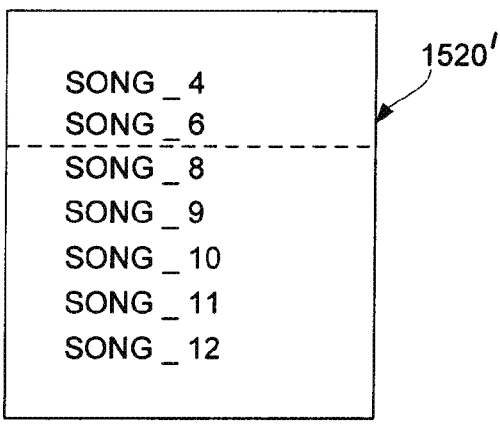
FIG. 15C illustrates an exemplary representation of an updated set of media items stored in a mobile media device according to one embodiment of the invention.

FIG. 15B illustrates an exemplary representation of an existing set 1520 of media items stored in a mobile media device according to one embodiment of the invention, and FIG. 15C illustrates an exemplary representation of an updated set 1520 of media items stored in the mobile media device according to one embodiment of the invention. The existing set 1520 of media items includes songs 1-7. At a subsequent point in time, when the mobile media device comes within a wireless network, then the existing set 1520 of media items can be updated to a new set 1520' of media items as illustrated in FIG. 15C, provided automatic remote shuffle is enabled and provided access to a remote media depository access is available. Here, it should be noted that in the new set 1520' of media items includes songs 4 and 6 that were part of the existing 1520 of media items as well as new songs 8-12. It should be noted that songs 1-3 and 5 are not included in the new set 1520'. The new songs 8-12 are provided from the media repository via the media update response. In this example, the new set 1520' retains a portion of the existing set 1520. Various criterion can be used to determine which of the media items in the existing set 1520 are to be replaced when forming the new set 1520'. Examples of such criterion include user ratings, play counts, genre, play history, time and location. One or more of the criterion can be used in this regard. As an example, the portion of the existing set 1520 that is to be retained in the new set 1520' can be selected because such songs have not been played recently, have high user ratings, or due to other reasons.

Multiple Access Point Discrimination

Still another aspect of the invention concerns discrimination of different access points associated with different establishments. In the event that a mobile device associated with a user is capable of communicating over two different wireless access points, each associated with them different establishments, the mobile device can assist the user in coupling to the appropriate wireless access point. In this regard, authentication can be utilized to distinguish the different access points. Authentication can also be utilized to filter out those access points that are not of interest to the user. For example, the user can maintain on the mobile device, a list of acceptable establishments, a list of previously utilized establishments, or a list of preferences for connection.

Additional information concerning wireless communication, media devices, content updates, synchronization and the like are provided in the following: (i) U.S. patent application Ser. No. 11/485,142, filed Jul. 11, 2006, and entitled "WIRELESS COMMUNICATION SYSTEM," now U.S. Pat. No. 7,724,716, which is hereby incorporated herein by reference; (ii) U.S. patent application Ser. No. 11/324,863, filed Jan. 3, 2006, and entitled "REMOTE CONTENT UPDATES FOR PORTABLE MEDIA DEVICES," now U.S. Patent Publication No. 2007/0169087, which is hereby incorporated herein by reference; (iii) U.S. patent application Ser. No. 11/210,172, filed Aug. 22, 2005, and entitled "AUDIO SAMPLING AND ACQUISITION SYSTEM," now U.S. Patent Publication No. 2006/0235864, which is hereby incorporated herein by reference; (iv) U.S. application Ser. No. 10/987,649, filed Nov. 12, 2004, and entitled "WIRELESS SYNCHRONIZATION BETWEEN MEDIA PLAYER AND HOST DEVICE," now U.S. Patent Publication No. 2006/0168351, which is hereby incorporated herein by reference; and (v) U.S. application Ser. No. 10/423,490, filed Apr. 25, 2003, and entitled "MEDIA PLAYER SYSTEM," now U.S. Pat. No. 7,627,343, which is hereby incorporated herein by reference.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that data, such as media data, can be provided to a portable media device by way of a wireless network, namely, a local wireless network, or by another portable media device. The wireless data exchange can be one-way or two-way. The wireless data exchange can also be automatic or on-demand. Another advantage of the invention is that user preferences, characteristics, interests or locations can be used to customize the data being provided to a portable electronic device. Still another advantage of the invention is that delivery of data, such as media data, can be provided by a distributed network of local servers provided at various different locations. The various different locations can pertain to establishments, venues, etc. that provide a local server that supports delivery of data to portable media devices at the respective locations.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A portable media device comprising:
a wireless interface; and
a processor configured to cause the portable media device to:
receive a broadcast of media content to users at a venue when the portable media device is in proximity of the venue;
compare information from a user profile stored on the portable media device against a set of predetermined rules to determine if it is permissible to transmit characteristics from the information, wherein the information includes characteristics that indicate a preference for certain types of media content;

transmit the information via the wireless interface to a wireless access point within the venue, wherein the transmitting includes transmitting only characteristics deemed permissible to transmit; and receive a broadcast of media content based upon the characteristics and based upon how long the portable media device has been located at various portions of the venue.

2. The portable media device of claim 1, wherein the receiving a broadcast is performed using a device other than the wireless interface.

3. The portable media device of claim 2, wherein the device other than the wireless interface is an audio tuner.

4. The portable media device of claim 1, wherein the characteristics include an age of a user of the portable media device.

5. The portable media device of claim 1, wherein the processor is further configured to cause the portable media device to:

receive a user interface customized based upon the characteristics and based upon how long the portable media device has been located at various portions of the venue.

6. A method comprising:

by a portable media device:

receiving a broadcast of media content to users at a venue when the portable media device is in proximity of the venue;

comparing information from a user profile stored on the portable media device against a set of predetermined rules to determine if it is permissible to transmit characteristics from the information, wherein the information includes characteristics that indicate a preference for certain types of media content;

transmitting the information via a wireless interface of the portable media device to a wireless access point within the venue, wherein the transmitting includes transmitting only characteristics deemed permissible to transmit; and receiving a broadcast of media content based upon the characteristics and based upon how long the portable media device has been located at various portions of the venue.

7. The method of claim 6, wherein the receiving a broadcast is performed using a device other than the wireless interface.

8. The method of claim 7, wherein the device other than the wireless interface is an audio tuner of the portable media device.

9. The method of claim 6, wherein the characteristics include an age of a user of the portable media device.

10. The method of claim 6, further comprising:

receiving a user interface customized based upon the characteristics and based upon how long the portable media device has been located at various portions of the venue.

11. A non-transitory computer readable medium having stored thereon instructions executable by a processor of a portable media device to cause the portable media device to:

receive a broadcast of media content to users at a venue when the portable media device is in proximity of the venue;

compare information from a user profile stored on the portable media device against a set of predetermined rules to determine if it is permissible to transmit characteristics from the information, wherein the information includes characteristics that indicate a preference for certain types of media content;

transmit the information via a wireless interface of the portable media device to a wireless access point within the venue, wherein the transmitting includes transmitting only characteristics deemed permissible to transmit; and receive a broadcast of media content based upon the characteristics and based upon how long the portable media device has been located at various portions of the venue.

12. The non-transitory computer readable medium of claim 11, wherein the receiving a broadcast is performed using a device other than the wireless interface.

13. The non-transitory computer readable medium of claim 12, wherein the device other than the wireless interface is an audio tuner of the portable media device.

14. The non-transitory computer readable medium of claim 11, wherein the characteristics include an age of a user of the portable media device.

15. The non-transitory computer readable medium of claim 11, wherein the instructions are further executable by the processor to cause the portable media device to:

receive a user interface customized based upon the characteristics and based upon how long the portable media device has been located at various portions of the venue.

* * * * *